United States Patent [19]
Doi et al.

[11] Patent Number: 5,754,189
[45] Date of Patent: May 19, 1998

[54] VIRTUAL ENVIRONMENT DISPLAY APPARATUS AND METHOD

[75] Inventors: Miwako Doi; Naoko Umeki; Nobuko Kato, all of Tokyo, Japan

[73] Assignee: Kabushiki Kaisha Toshiba, Japan

[21] Appl. No.: 419,421

[22] Filed: Apr. 10, 1995

[30] Foreign Application Priority Data

Apr. 13, 1994 [JP] Japan .................................. 6-074693

[51] Int. Cl.⁶ .................................................. G06T 1/00
[52] U.S. Cl. .................... 345/473; 345/474; 345/959; 345/427
[58] Field of Search .................. 364/474, 443, 364/474.01; 395/152, 173, 125, 127, 174; 345/473–474, 425, 427, 949, 959

[56] References Cited

U.S. PATENT DOCUMENTS

| | | | |
|---|---|---|---|
| 3,899,662 | 8/1975 | Kreeger et al. | 395/152 |
| 4,807,202 | 2/1989 | Cherri et al. | 367/129 |
| 5,006,991 | 4/1991 | Ohcoshi et al. | 364/474.2 |
| 5,179,638 | 1/1993 | Dawson et al. | 395/125 |
| 5,261,041 | 11/1993 | Susman | 395/173 |
| 5,442,734 | 8/1995 | Murakami et al. | 395/127 |
| 5,490,239 | 2/1996 | Myers | 395/129 |
| 5,495,576 | 2/1996 | Ritchey | 395/125 |

OTHER PUBLICATIONS

*Second Edition, Computer Graphics, Principles and Practice*, by James D. Foley, et al., pp. 741–745, 1015–1018 and 1100–1102, Addison–Wesley Publishing Company.

Animation For a Virtual Subject, by Miwako Doi et al., Research and Development Center, Toshiba, Advanced Microcomputer Systems Engineering Dept., Toshiba, pp. 270–279.

Human Engineering Guide To Equipment Design, sponsored by Joint Army–Navy Air Force Steering Committee; Editors: Clifford T. Morgan, Jesse S. Cook, III, Alphonse Chapanis and Max W. Lund; Mc Graw–Hill Book Company, Inc., pp. 504–559.

*Primary Examiner*—Joseph H. Feild
*Attorney, Agent, or Firm*—Graham & James LLP

[57] ABSTRACT

A display apparatus displays behavior of a human model in an environment model. In the apparatus, a memory stores environment model data, human model data and patrolling path data in the environment model. A display displays the behavior of the human model in the environment model and special part of the environment model. The behavior includes the human model walking along the patrolling path. The special part includes a simulation result corresponding to an user operation. A change section changes the behavior of the human model and the selected portion of the environment model through the display means according to the user designation.

21 Claims, 30 Drawing Sheets

FIG. 2 i: ID NUMBER OF POSITION DATA
o: ID NUMBER OF OBJECT FIGURE DATA
a: ID NUMBER OF OBJECT ATTRIBUTE
p: (X,Y,Z) COORDINATE
v: ROTATION ANGLE OF (X,Y,Z) AXIS

OBJECT POSITION DATA i: 0
o: 11
a: 0
p: 90.81, 0.00, 163.53,
v: 0, 0, 0, i: 1
o: 12
a: 1
p: 3.50,36, 0.00, 591,72
v: 0, 0, 0, i: 2
o: 11
a: 0
p: 91,92, 0.00, 320.66,
v: 0, 0, 0, i: 3
o: 11
a: 0
p: 222.01, 0.00, 168.30
v: 0, 0, 0, i: 4
o: 11
a: 0
p: 223.74, 0.00, 320.66
v: 0, 0, 0, i: 5
o: 12
a: 1
p: 64.17, 0.00, 577.55
v: 0, 0, 0, i: 6
o: 12
a: 1
p: 197.78, 0.00, 581.09
v: 0, 0, 0, i: 7
o: 12
a: 1
p: 482.17, 0.00, 583.09,
v: 0, 0, 0, i: 8
o: 13
a: 2
p: 350.35, 0.00, 259.71,
v: 0, 0, 0, i: 9
o: 13
a: 2
p: 352.09, 0.00, 327.95,
v: 0, 0, 0, i: 10
o: 13
a: 2
p: 087.00, 0.00, 217.91,
v: 0, 0, 0, i: 11
o: 13
a: 2
p: 485.64, 0.00, 324.21,
v: 0, 0, 0,

| KEY POINT | COORDINATE | ATTRIBUTE |
|---|---|---|
| 1 | $(x1, y1, z1)$ | S |
| 2 | $(x2, y2, z2)$ | D |
| 3 | $(x3, y3, z3)$ | M |
| ⋮ | ⋮ | ⋮ |
| n | $(xn, yn, zn)$ | E |

Fig.3

| FIRST ELEMENT | SECOND ELEMENT | CONNECTED ELEMENTS |
|---|---|---|
| HEAD (P2)<br>RIGHT ARM (P1-4)<br>LEFT ARM (P1-3)<br>RIGHT LEG (P1)<br>LEFT LEG (P1) | BODY (P1)<br>BODY (P3-u)<br>BODY (P4-u)<br>BODY (P2-r)<br>BODY (P2-l) | HUMAN MODEL |
| RIGHT LOWER ARM (P1) | RIGHT UPPER ARM (P2) | RIGHT ARM |
| LEFT LOWER ARM (P1) | LEFT UPPER ARM (P2) | LEFT ARM |
| RIGHT LOWER LEG (P1) | RIGHT UPPER LEG (P2) | RIGHT LEG |
| LEFT LOWER LEG (P1) | LEFT UPPER LEG (P2) | LEFT LEG |

P~ : CONNECTION POSITION

*Fig.5*

| BEHAVIOR | ELEMENT | POSE ANGLE (AXIS) | | | LIMIT OF LOCATION ANGLE (AXIS) | | |
|---|---|---|---|---|---|---|---|
| | | x | y | z | x | y | z |
| WALK | RIGHT UPPER ARM | -30 | 0 | 0 | 30~ -30 | 0 | 0 |
| | LEFT UPPER ARM | 30 | 0 | 0 | 30~ -30 | 0 | 0 |
| | RIGHT UPPER LEG | -15 | 0 | 0 | 15~ -15 | 0 | 0 |
| | LEFT UPPER LEG | 15 | 0 | 0 | 15~ -15 | 0 | 0 |
| | RIGHT LOWER ARM | 0 | 0 | 0 | 0~ -30 | 0 | 0 |
| | LEFT LOWER ARM | -30 | 0 | 0 | 0~ -30 | 0 | 0 |
| | RIGHT LOWER LEG | 0 | 0 | 0 | 30~ 0 | 0 | 0 |
| | LEFT LOWER LEG | 30 | 0 | 0 | 30~ 0 | 0 | 0 |

Fig.7

| ID NUMBER OF FIGURE DATA | BOUNDING BOX | POINTER TO DETAILED FIGURE DATA |
|---|---|---|
| 1 | $(x_{01}, y_{01}, z_{01})$ $(x_{02}, y_{02}, z_{02})$<br>$(x_{03}, y_{03}, z_{03})$ $(x_{04}, y_{04}, z_{04})$<br>$(x_{05}, y_{05}, z_{05})$ $(x_{06}, y_{06}, z_{06})$<br>$(x_{07}, y_{07}, z_{07})$ $(x_{08}, y_{08}, z_{08})$ | $P_0$ |
| 2 | $(x_{11}, y_{11}, z_{11})$ $(x_{12}, y_{12}, z_{12})$<br>$(x_{13}, y_{13}, z_{13})$ $(x_{14}, y_{14}, z_{14})$<br>$(x_{15}, y_{15}, z_{15})$ $(x_{16}, y_{16}, z_{16})$<br>$(x_{17}, y_{17}, z_{17})$ $(x_{18}, y_{18}, z_{18})$ | $P_1$ |

```
Object Attribute Data

ATT - ID :              ← ID NUMBER OF ATTIRIBUTE DATA
CLASS :                 ← KIND OF ATTRIBUTE    ⎛ 0 : LEVER
                                               ⎜ 1 : BUTTON
                                               ⎝ 2 : PANEL
LEVER
CLASS :                 ← LEVER
Axis :                  ← ROTATION AXIS    1=X, 2=Y, 3=Z
Num - of - Gears :      ← NUMBER OF GEAR
Range :                 ← ANGLE RANGE OF GEAR POSITION
Gear - Position :       ← ANGLE OF GEAR POSITION
Sound - file - No :     ← NUMBER OF SOUND BUTTON
On - Position :         ← COORDINATE OF BUTTON "ON"
On - Color :            ← COLOR OF BUTTON "ON"
Off - Color :           ← COLOR OF BUTTON "OFF"
Sound - file - No :     ← NUMBER OF SOUND PANEL
On - Color :            ← COLOR OF SWITCH "ON"
Off - Color :           ← COLOR OF SWITCH "OFF"
```

```
ATT - ID : 0
CLASS   : 0 # (( null ))
Axis    : 0 # (( null ))
Num - of - Gears: 2
Range :           30
Gear - Position : 60  120
Sound - file - No : 9

ATT - ID  : 1
CLASS     : 2 #(( null ))
On - Color :   230  120  250
Off - Color :  200  200  100

ATT - ID     : 2
CLASS        : 1 #(( null ))
On - Position :  120  000  000
On - Color    :  256  000  000
Off - Color   :  200  200  200
Sound - file - No : 8
```

Fig.10

Object Connection Data

NUMBER : Connection data number
PARENT : Parent object position - i d
CHILD   : Child object position - i d

---

NUMBER : 0     ← I D of Object Connection Data
PARENT : 0     ← I D of Parent Object
CHILD  : 2     ← I D of Child Object

NUMBER : 1
PARENT : 2
CHILD  : 5

NUMBER : 2
PARENT : 3
CHILD  : 4

NUMBER : 3
PARENT : 4
CHILD  : 6

NUMBER : 4
PARENT : 9
CHILD  : 1

NUMBER : 5
PARENT : 11
CHILD  : 7

*Fig.11*

START DIRECTION OF VIRTUAL PATROL PERSON ON THE MAP

VIEW SCOPE OF VIRTUAL PATROL PERSON

| DIVISION | PEAK COORDINATE | POINTER TO IMAGE DATA |
|---|---|---|
| 1 | $(x11, z11)$ | $P\,11$ |
|   | $(x12, z12)$ | $P\,12$ |
|   | $(x13, z13)$ | $P\,13$ |
|   | $(x14, z14)$ | $P\,14$ |
|   | Null | $P\,10$ |
| 2 | $(x21, z21)$ | $P\,21$ |
|   | $(x22, z22)$ | $P\,22$ |
|   | $(x23, z23)$ | $P\,23$ |
|   | $(x24, z24)$ | $P\,24$ |
|   | $(x25, z25)$ | $P\,25$ |
|   | Null | $P\,20$ |

Fig.32

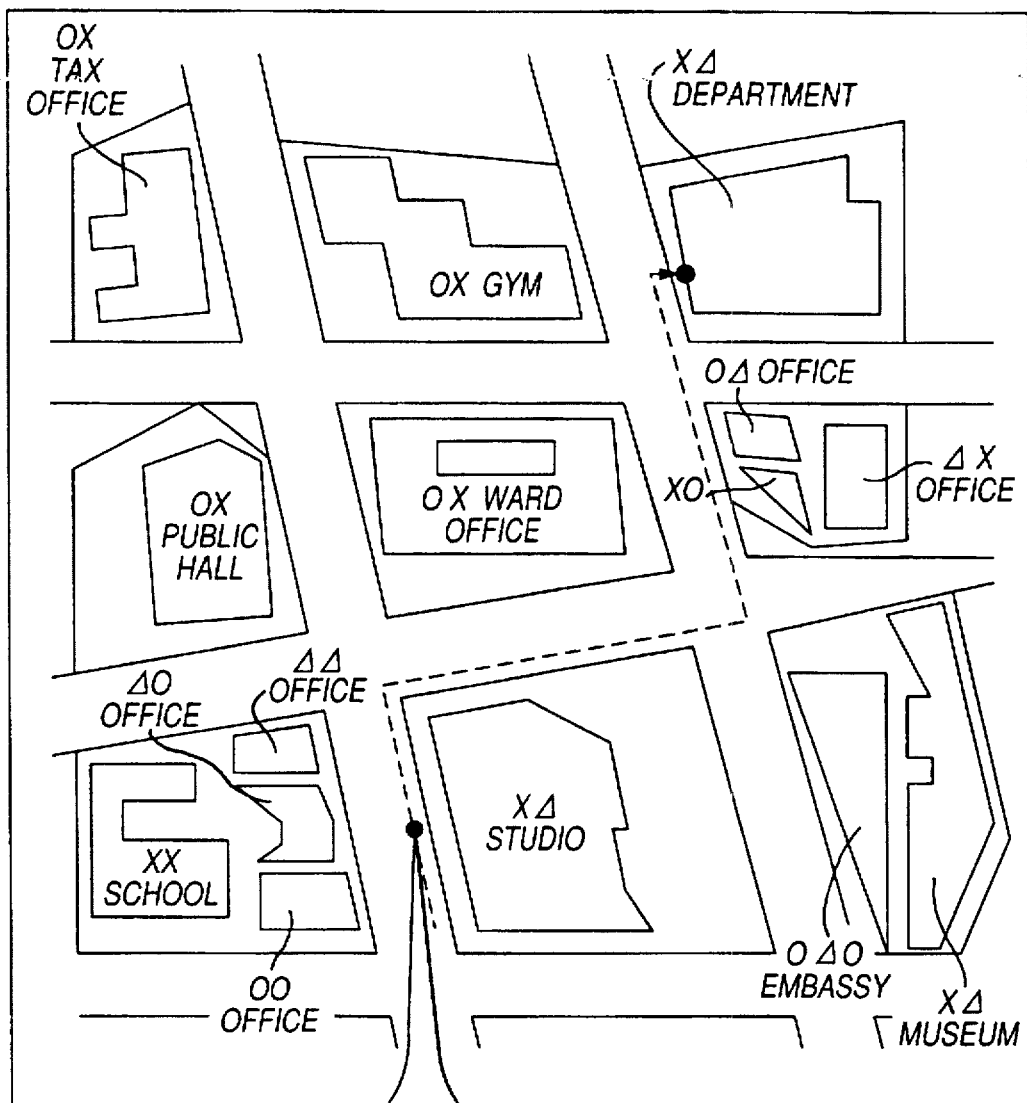
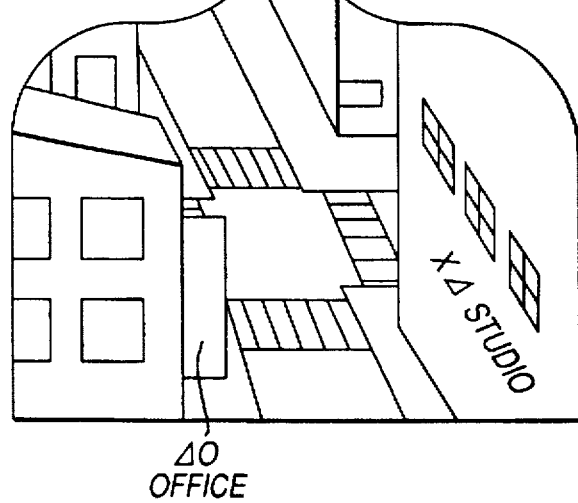
Fig.35

VIRTUAL ENVIRONMENT DISPLAY APPARATUS AND METHOD

BACKGROUND OF THE INVENTION

1. Field of the Invention

The present invention relates to display apparatus and a method for displaying behavior of a human model in an environment model.

2. Description of the Background Art

In a large scale plant, such as a power station or a chemical factory, drive control is especially executed in a central-operation room. However, in unusual situations, such as an accident or damage, it is necessary for an operater to directly operate a local panel at the location of the accident.

In order to deal with the unusual situation smoothly, it is necessary to train an operator to learn the route to the panel location and to operate the local panel.

In some cases, a real device for training, such as a local panel in the working place, is provided and some operators imitate the operation of the local panel. However, it is neccessary to prepare the real device for each plant or working place, and great cost and space are needed for the training.

To solve this problem, as a training system, a method in which a local panel is displayed by a computer is used. However, in this method, the local panel on display is changed according to the kind of location. In short, a path between the locations is not displayed. Therefore, when the worker goes to the location where the accident happened, he cannot find a path to the next location smoothly.

As training for walking along a patrolling path, a walk-through simulator (ex. roller-skating) is considered ("Implementation and Analysis of walking Dynamics for a Walkthrough Simulator" (Human Interface, the Society of Instrument and Control Engineers News & Report, Vol.8, pp.199–204)). In this method, although the actual position of the worker is fixed, a virtual environment on display is gradually changed in accordance with movement of the roller-skating. An HMD(Head Mounted Display) which is put on the user's head is used. In the HMD, a three-dimensional position sensor detects a relative position of the user's head and a virtual environment corresponding to the direction of the detected position is displayed inside the HMD. Therefore, the user can watch the virtual environment corresponding to the direction of line of sight. However, the user can only view the area in his line of sight inside the HMD and it is difficult for the user to understand his location in relation to the environment. Therefore, he cannot learn the path between locations correctly.

On the other hand, path-guidance is applied to street-guidance. For example, when a walker goes from the underground to the ground level at a subway station, path-guidance is necessary for the walker. In accordance with present path-guidance, the walker confirms the destination by studying the ground-map in the subway station. However, after going up the stairs from the underground station, the walker cannot find the direction of the destination on the ground immediately. In short, he cannot understand the correspondence between the ground and the ground-map, when he actually reaches the ground level.

SUMMARY OF THE INVENTION

It is therefore an object of the present invention to provide display apparatus and method by which a trainee can learn both operation of a local panel and walking along a path between panels correctly.

It is another object of the present invention to provide display apparatus and method by which a user can understand correspondence between direction of his walking on a ground-map and actual environment of the direction of his walking on the ground correctly.

According to the present invention, there is provided

Display apparatus for displaying behavior of a human model in an environment model, comprising:
  memory means for storing data representing the environment model, data representing the human model and data representing a patrolling path in the environment model;
  display means for displaying behavior of the human model in the environment model, wherein the behavior includes the human model walking along the patrolling path, and a selected portion of the environment model, wherein the selected portion includes a simulation result corresponding to a user operation; and
  change means for changing behavior of the human model and the selected portion of the environment model being displayed by said display means according to user designation.

Also in accordance with the present invention there is provided,

A display method for displaying behavior of a human model in an environment model, said method comprising the steps of:
  displaying behavior of the human model in the environment model, wherein the behavior includes the human model walking along a patrolling path, and a selected portion of the environment model, wherein the selected portion includes simulation result corresponding to a user operation, according to pre-stored environment model data, human model data and patrolling path data; and
  changing the behavior of the human model and the selected portion of the environment model being displayed in the displaying step, according to user designation.

Also in accordance with the present invention there is provided,

Display apparatus for displaying a map including a path from a start point to an end point, comprising:
  memory means for storing environment data by unit of block of the map, wherein the environment data of each block includes a peak coordinate of the block on a two-dimensional plane, side image data and plane image data of the block in three-dimensional space;
  input means for inputting an user's stature data,
  display means for displaying the map including the path according to the peak coordinate and the plane image data of each block on the map; and
  control means for calculating a view point corresponding to the user's stature data and for generating a view scope image according to the view point and the side image data of the block along the path:
  wherein said display means displays the view scope image corresponding to a movement direction along the path on the map.

Also in accordance with the present invention there is provided,

A display method for displaying a map including a path from a start point to an end point, said method comprising the steps of:

inputting user's stature data;

displaying the map including the path according to prestored peak coordinate and plane image data of each block on the map, wherein the peak coordinate on two-dimensional plane, the plane image data and side image data in three-dimensional space comprise environment data by unit of block on the map;

calculating a view point corresponding to the user's stature data;

generating a view scope image according to the view point and the side image data of the block along the path; and displaying the view scope image corresponding to a movement direction along the path on the map.

BRIEF DESCRIPTION OF THE DRAWINGS

FIG. 2 is a format of position data file stored in a spot environment memory section.

FIG. 3 is a format of patrolling path data stored in the spot environment memory section.

FIG. 5 is a format of connection order data of the virtual patrol person stored in the virtual patrol person memory section.

FIG. 7 is behavior data of each element when the human model walks in three-dimensional virtual space.

FIG. 10 is a format of an attribute data file stored in the spot environment memory section.

FIG. 11 is a format of an object connection data file stored in the spot environment memory section.

FIG. 32 is a format of environment data stored in an environment memory section.

FIG. 35 is a schematic diagram of a plane map and a view scope on display.

DETAILED DESCRIPTION OF THE PREFERRED EMBODIMENTS

Figure 1:
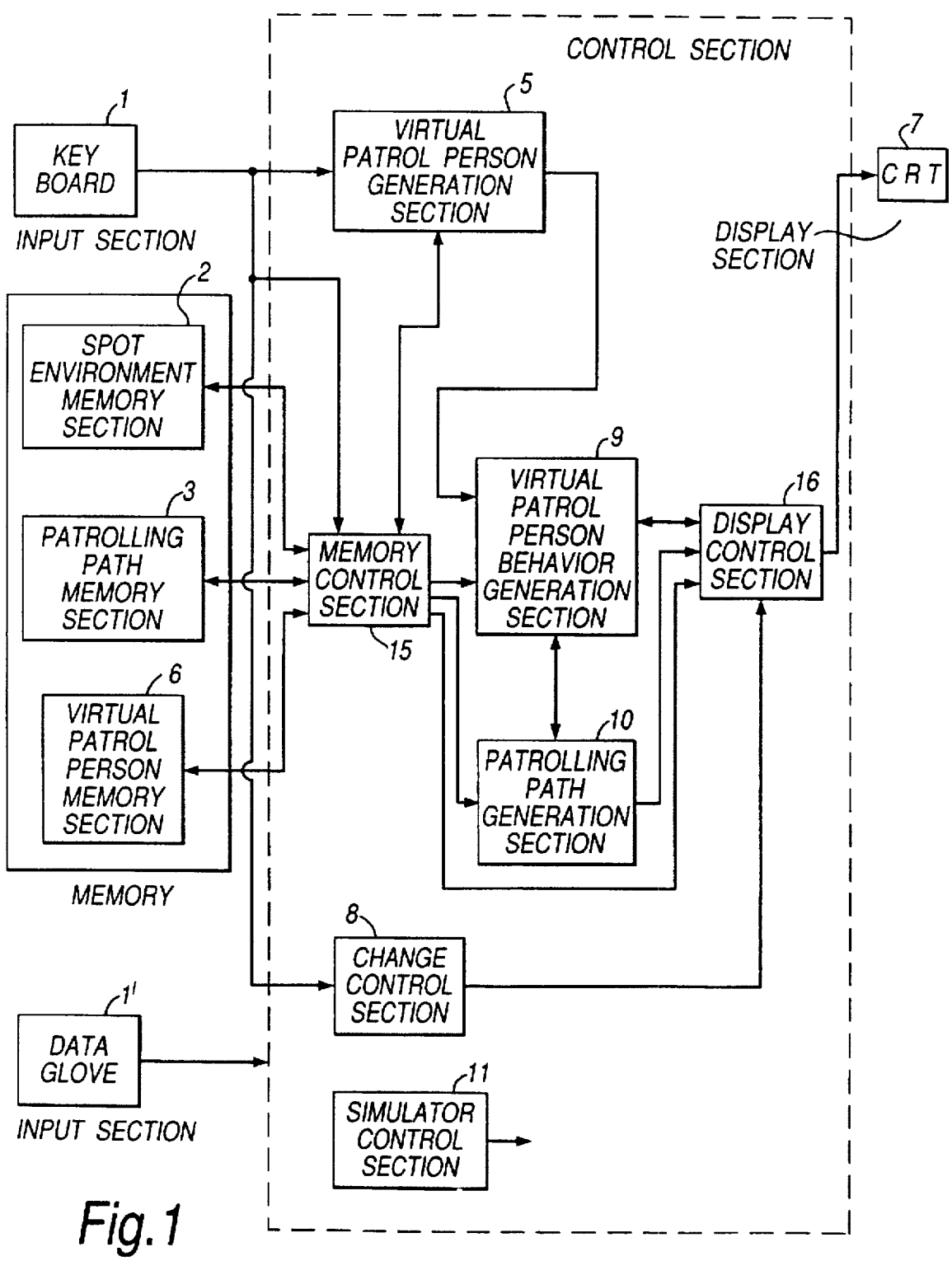
FIG. 1 is a block diagram of display apparatus according to a first embodiment of the present invention.

FIG. 1 is a block diagram of display apparatus according to a first embodiment of the present invention. Object data (ex. local or spot panel) in a working place is created by three-dimensional CAD. Then, the object data is written in a file according to a suitable format (ex. dxf-format, IGES-format). In FIG. 1, input section 1 is a keyboard or pointing device (mouse), which reads the object data from the file and an user designates a location of the object in the working place. Input section 1' is a data-glove or three-dimensional position sensor (magnetic sensor) for inputting a hand's position or a head's position. Three-dimensional position data of objects and a path which are supplied through the input section 1 are stored in a spot environment memory section 2 as shown in FIG. 2. Patrolling path data (working order of keypoints in the working place) is stored in a patrolling path memory section 3 as shown in FIG. 3. The patrolling path data is also supplied through the input section 1. (These sections are explained in detail below)

Figure 4:
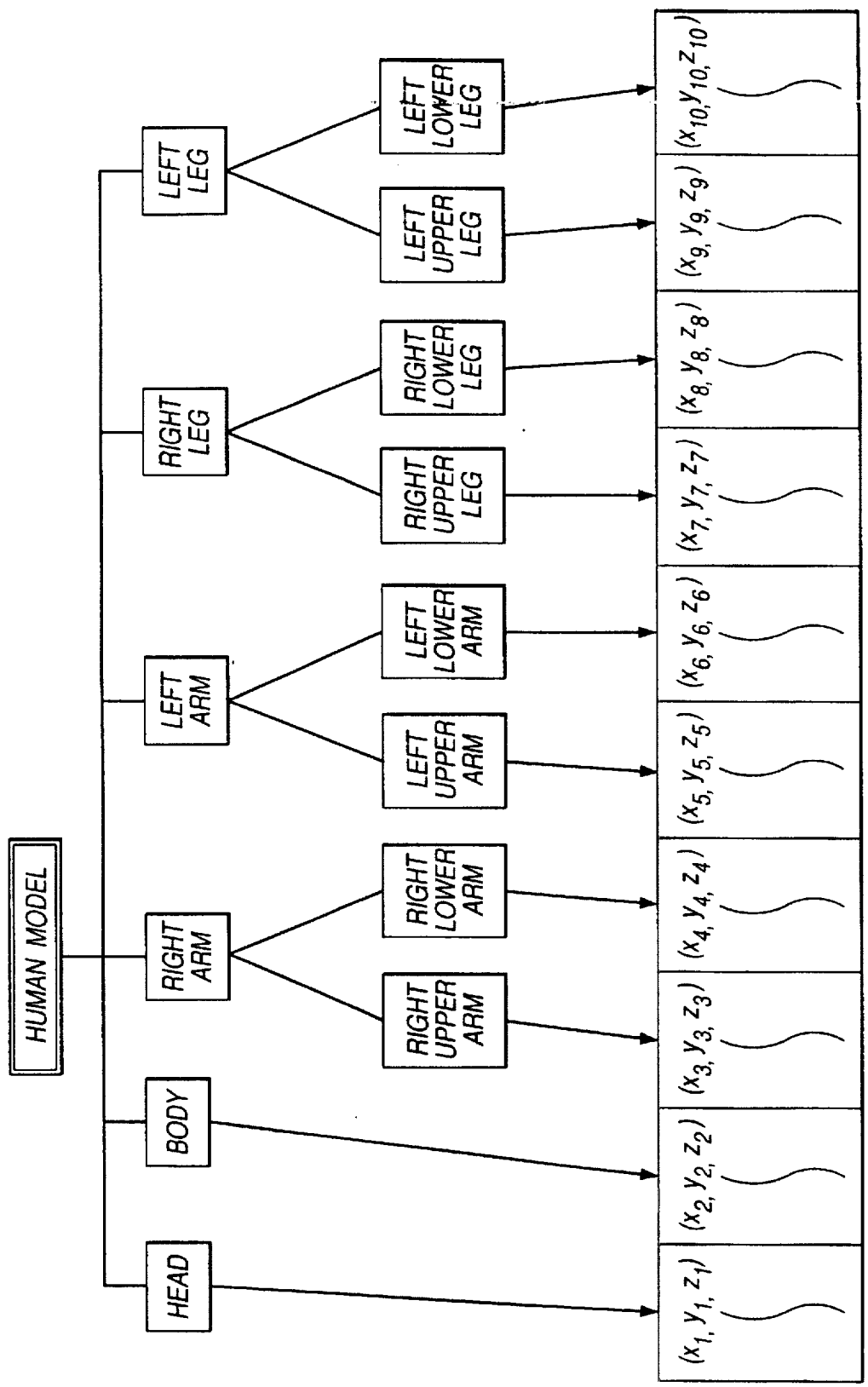
FIG. 4 is a format of element position data of a virtual patrol person stored in a virtual patrol person memory section.
Figure 6:
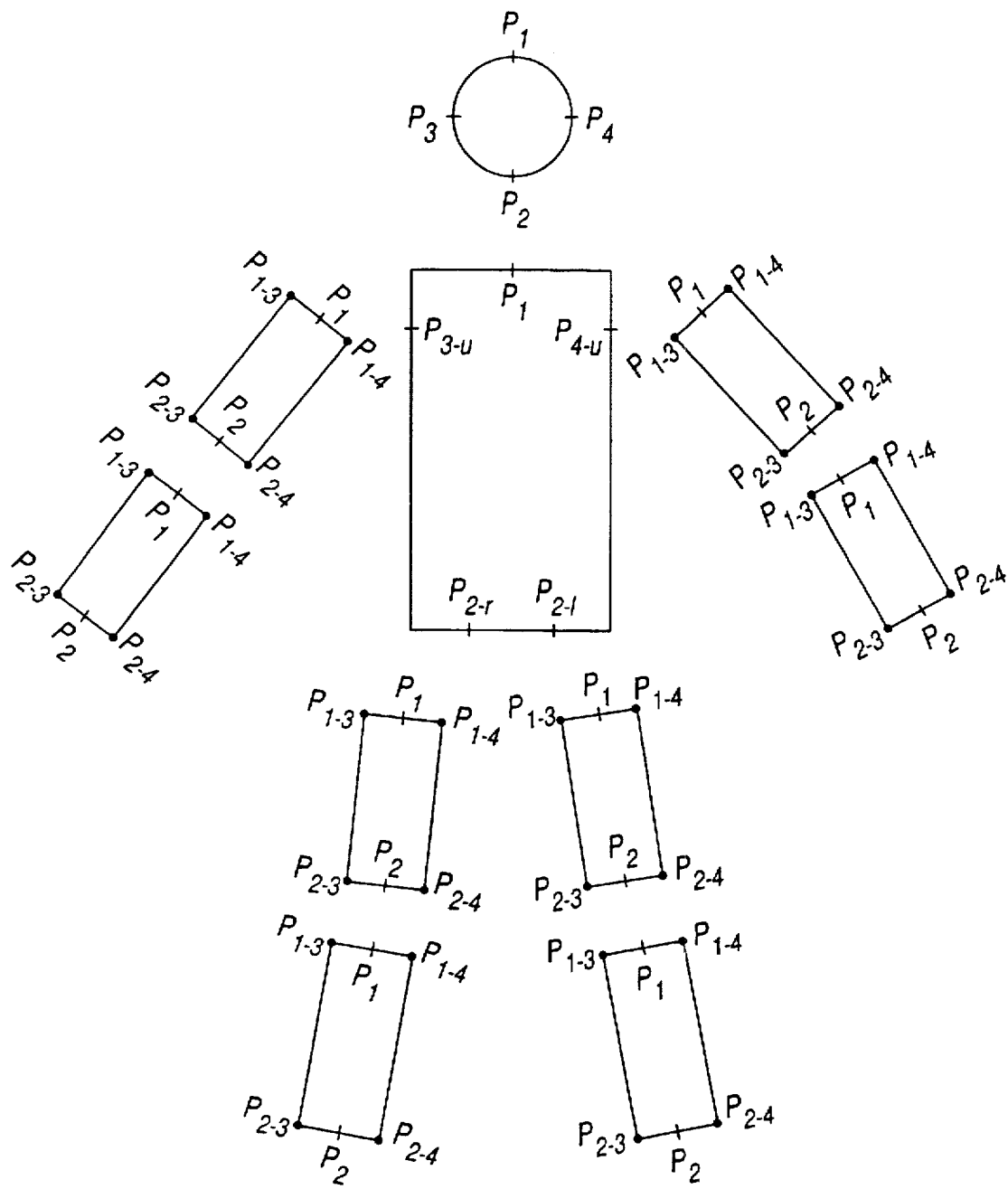
FIG. 6 is a schematic diagram of connection order of each element of a human model.
Figures 8, 9:
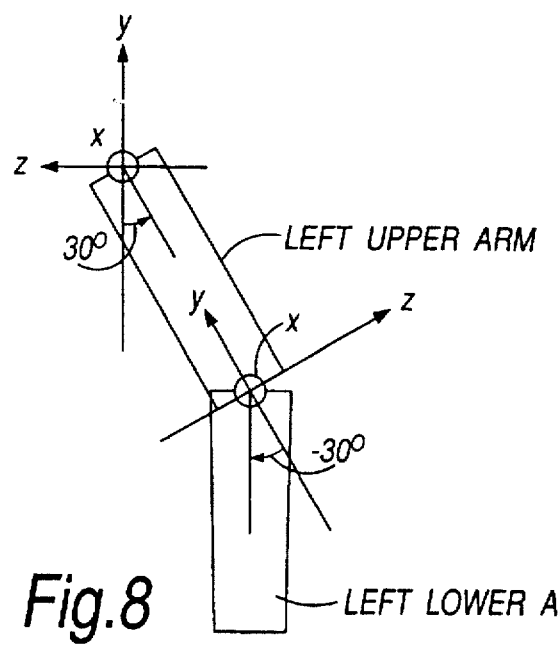
FIG. 8 is a schematic diagram of the action of the left arm when the human model walks.
FIG. 9 is a format of figure data for each kind of object stored in the spot environment memory section.

Instead of an actual worker, a three-dimensional figure and position of a virtual patrol person (human model) is stored in a virtual patrol person memory section 6. The virtual patrol person data (human model data) is comprised of element position data, connection order data and behavior data. FIG. 4 is the element position data of the virtual patrol person. Each element is a part of the body of the virtual patrol person, such as head, trunk, right arm, left arm, right leg, left leg. The arm is comprised of an upper arm and a lower arm. The leg is comprised of an upper leg and a lower leg. As shown in FIG. 4, peak coordinates of each element in local coordinate space are stored in the virtual patrol person memory section 6. In this place, the local coordinate space is based on an x-y-z coodinate system including only the elements of the human model. FIG. 5 is the connection order data of the virtual patrol person. The connection order data is connection position data between neighboring elements (first element and second element) of the human model. FIG. 6 is a schematic diagram of the connection order of each element of the human model. The neighboring elements of the human body are connected at connection points (p1,p2 . . . ) and form the human model. FIG. 7 is the behavior data of each element when the human model walks in three-dimensional virtual-space. The behavior data is comprised of pose angle and limit of rotation angle for each element (arm,leg. . . . ). The pose angle and the limit of rotation angle are represented for the x-y-z axes of local coordinate space. FIG. 8 is a schematic diagram of action of the left arm when the human model walks according to the behavior data. In FIG. 8, the upper arm rotates (30°) around the x-axis of the upper end according to the pose angle. As one example, the lower arm rotates (−30°) around the x-axis of the lower end of the upper arm according to the limit of rotation angle ((−30°), because the limit of rotation angle of the left lower arm is (0—30°)).With reference again to FIG. 1, the control section can be included in the control processing unit of computing apparatus used in the practice of the present embodiment.

The virtual patrol person generation section 5 reads out the virtual patrol person data from the virtual patrol person memory section 6 through a memory control section 15, and generates the virtual patrol person (human model) by combining each element of the human body. First, peak coordinates of each element are transformed from local coordinate space to global coordinate space according to the element position data (in FIG. 4). In this place, the global coordinate space is based on x-y-z axes including working place, objects and patrolling path. Second, neighboring elements of the human body are connected by the connection position according to the connection order data (in FIG. 5). In these ways, the human model (virtual patrol person) is generated in global coordinate space. Then, the virtual patrol person generation section 5 renders the human model elastic according to user's anthropological data (The user's anthoropological data is previously supplied through the input section 1). In short, the length of each element of the human model in long direction is elastic according to the user's stature. Therefore, if the user is tall, the stature of the human model is controlled to be tall. If the user is short, the stature of the human model is controlled to be short. This method is disclosed in "Human Engineering Guide To Equipment Design" by McGraw-Hill Book Company, incorporated herein by reference.

A patrolling path generation section 10 reads out working place data (including objects) and patrolling path data from the spot environment memory section 2, path order data (key point) from the patrolling path memory section 3 and the human model data from the virtual patrol person generation section 5 through the memory control section 15. Then, the patrolling path generation section 10 generates the patrolling path by connecting between keypoints, and decides whether the human model conflicts with the objects along the patrolling path in the global coordinate space. If the human model conflicts with the object, the patrolling path is amended to avoid the human model conflicting with the object. In these ways, the patrolling path data is supplied to a virtual patrol person behavior generation section 9. The virtual patrol person behavior generation section 9 generates behavior of the human model's walk along the patrolling path in global coordinate space. The behavior of human model's walk is outputted through a display section 7 (CRT or HMD).

When the trainee (user) wants to directly train for operation of spot panel during display of the human model's walk to the spot panel, the trainee inputs a designation signal for changing through the input section 1 or 1'. In response to the designation signal, a change control section 8 changes the display scene from an environment including the human model's behavior to an environment without the human model, through the display control section 16. For example, first the display section 7 displays a scene in which the virtual patrol person walks along the patrolling path in a three-dimensional environment. When the virtual patrol person gets to the spot panel after walking along the patrolling path on display, the user inputs the designation signal for changing. In response to the designation signal, the display section 7 changes to scene to the spot panel without the virtual patrol person, which scene is displayed from the user's view point (user's view point is calculated from the anthropological data). Then, the user inputs the operation signal through the input section 1 or 1', which operation signal corresponds to the spot panel on display. In response to the operation signal, a simulation control section 11 executes quasi-simulation corresponding to the operation in the virtual environment. The simulation control section 11 outputs a simulation result through the display section 7. After training by the simulation in the virtual environment, the user inputs the designation signal for changing again. In response to the designation signal, the display section 7 changes to the scene in which the virtual patrol person walks along the patrolling path from the spot panel to the next spot panel.

FIGS. 2, 9, 10, 11, show one example of a memory format of the spot environment memory section 2. FIG. 2 is one example of position data file, in which each object data is in global coordinate space (three-dimensional virtual environment). As shown in FIG. 2, the position data of each object includes: ID of the object(i), ID of figure data(o), ID of attribute data(a), x-y-z coordinate(p), and rotation angle (r). The ID of figure data is the ID number of a figure data file (in FIG. 9). The ID of attribute data is the ID number of an attribute data file (in FIG. 10). The x-y-z coordinate is the actual position of the object in global coordinate space (x-y-z axis). The rotation angle is the actual direction of the object in global coordinate space (x-y-z axis).

FIG. 9 is one example of figure data for each kind of object. The figure data includes ID number, bounding box, and a pointer for detailed figure data. The ID number of figure data in FIG. 9 corresponds to the ID number of figure data in FIG. 2. The position data in FIG. 2 is stored by unit of each object. However, the figure data in FIG. 9 is stored by unit of the kind of object. The bounding box is eight peak coordinates of a circumscribed rectangle of the kind of object in local coordinate space (x-y-z axis applied for the kind of object). The pointer for a detailed figure is a pointer to the detailed figure data file (it is omitted in FIG. 9).

FIG. 10 is one example of an attribute data file for each kind of object. The illustrated attribute data is actual reaction (simulation) of the object when the user operates the object. In FIG. 10, attribute ID "0" is a gear (CLASS is "0"), the set position of the gear is "2" (Num-of-Gears), the angle range of the gear's position is 30°, the angle of the gear's position is 60°, 120° (Gear-Position), and the file number of the sound in operation of the gear is 9 (Sound-file-No). In the same way, attribute ID "1" is a panel (CLASS is "2"), color of switch "on" (On-Color) is 230(red) • 120(green) • 50(blue), color of switch "off" (off-color) is 200(red) • 200(green) • 100(blue). For example, in FIG. 2, object of position data(i=0) includes attribute data(a=0). Therefore, the object(i=0) has the attribute of gear (ATT-ID:0). When the user operates the object(i=0), the object is activated as a gear defined by the attribute data (ID:0).

FIG. 11 is one example of an object connection data file, which represents a subordinate relation between objects. In FIG. 11, object connection data (NUMBER:0) shows that an object of position data(0) has an object of position data(2) as child. In short, when the user operates the parent object of position data(0), the child object of position data(2) is also operated. (If the parent object is "ON", the child object is "ON". If the parent object is "OFF", the child object is "OFF".) If the position of the parent object is changed in global coordinate space, the position of the child object is also changed. For example, in FIG. 2, if the position of the parent object is (Xp,Yp,Zp) and the relative position of the child object for the parent object is (Xe,Ye,Ze), the position of the child object is defined as "(Xc,Yc,Zc)=(Xp+Xe,Yp+Ye,Zp+Ze)". If the position of the parent object is changed to (Xp',Yp',Zp'), the position of the child object is also changed to "(Xc',Yc',Zc')=(Xp'+Xe,Yp'+Ye,Zp'+Ze)".

FIG. 3 is one example of memory format of the patrolling path memory section 3. In FIG. 3, coordinate and attribute of key point (ex. start point, end point, . . . ) of the environment model in global coordinate space are stored. The attribute includes start point(S), end point(E), door(D) through which human model should pass, entrance of elevator(VS), exit of elevator(VE), start point of stairs(SS), end point of stairs(SE), start point of escalator(CS), end point of escalator(CE), working place(M) and so on.

Figure 12:
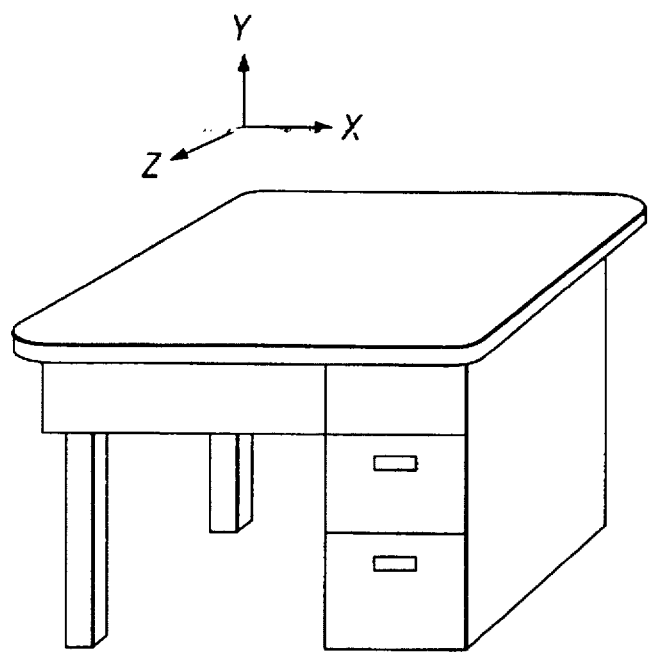
FIG. 12 is a schematic diagram of an object located in global coordinate space.
Figure 13:
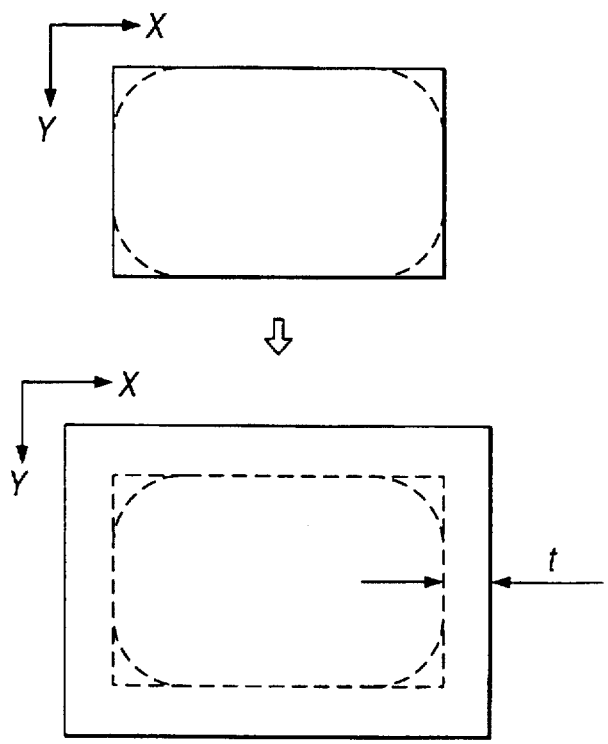
FIG. 13 is plane map of the object shown in FIG. 12.
Figure 14:
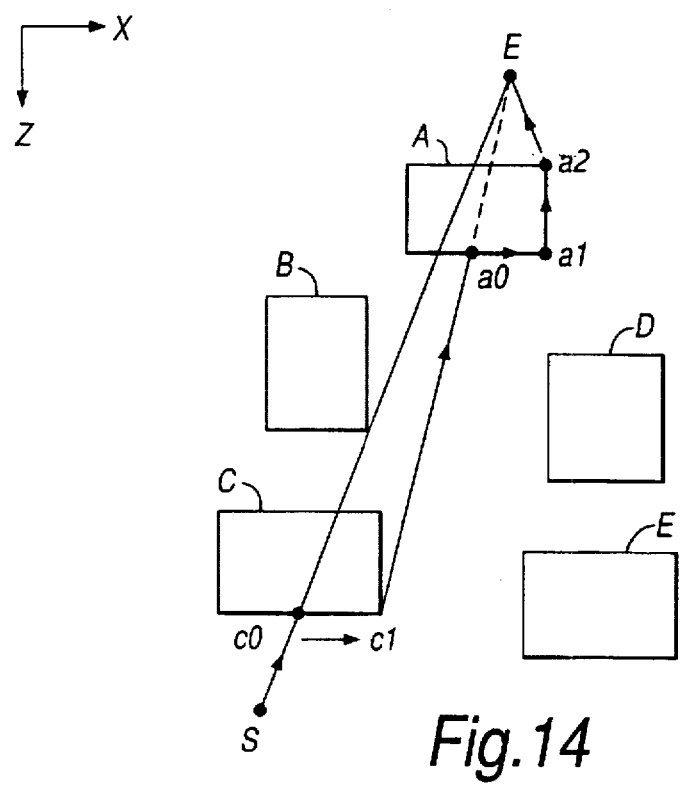
FIG. 14 is plane map of three objects and a patrolling path.

The patrolling path generation section 10 generates the patrolling path as follows. In this case, a conflict between the projected polygon of an object on the floor and the path connected by key points is decided. For example, as shown in FIG. 12, the object(desk) is located in global coordinate space(X-Y-Z axis). FIG. 13 is a plane map of the object. In this case, thickness(t) is set around the circumscribed rectangle of the object, because the thickness which the human model can pass by the object must be set to avoid the human model conflicting with the object. As shown in FIG. 14, three objects (A,B,C) are located in global coordinate space, and start point(s) and end point(E) of patrolling path are set. The three objects (A,B,C) includes thickness(t) respectively. In this case, a segment between start point(s) and end point(E) conflicts with object A and object C. Therefore, first, conflict point(c0) between the segment and the object C is detected. Then, a path from the point(C0) to peak point(C1) of the object C is detected. Second, a segment between the peak point (C1) and the end point(E) is detected. Conflict point (a0) between the segment and the object A is detected. Then, a path from the conflict point (a0) to peak (a1) of object A is detected, and the path from the peak point (a1) to peak point (a2) is detected. Third, a segment between the peak point (a2) and the end point (E) is detected. In these ways, instead of the path (S→E) which conflicts with the objects, the path (S →C0→C1→a0→a1→a2→E) which does not conflict with the object is detected. Otherwise, another method disclosed in "Computer Graphic: Principles and Practice". pp.741–745, 1015–1018, incorporated herein by reference may be used.

As mentioned above, the virtual patrol person behavior generation section 9 generates the behavior of the virtual patrol peron along the patrolling path. This method is disclosed in "Animation for A Virtual Subject" Proc. of NICOGRAPH 1993, pp.270–279, incorporated herein by reference. In short, basic behavior of each element of the human model's walk is previously prepared and the behavior of the human model's walk is generated by combining the basic behavior. In this place, a simple walk on a flat floor, and going up (down) stairs are different. In the present invention, different basic behaviors of a human model's walk are combined according to attributes of corresponding keypoints in FIG. 3. For example, if an attribute of keypoint is "S", the keypoint is the start point of stairs. Therefore, the y-coordinate of keypoint "SS" is compared with the y-coordinate of keypoint "SE" which is the end point of the stairs. If the difference is a positive value, basic behavior of going up stairs is used. If the difference is a negative value, basic behavior of going down stairs is used.

Figure 15:
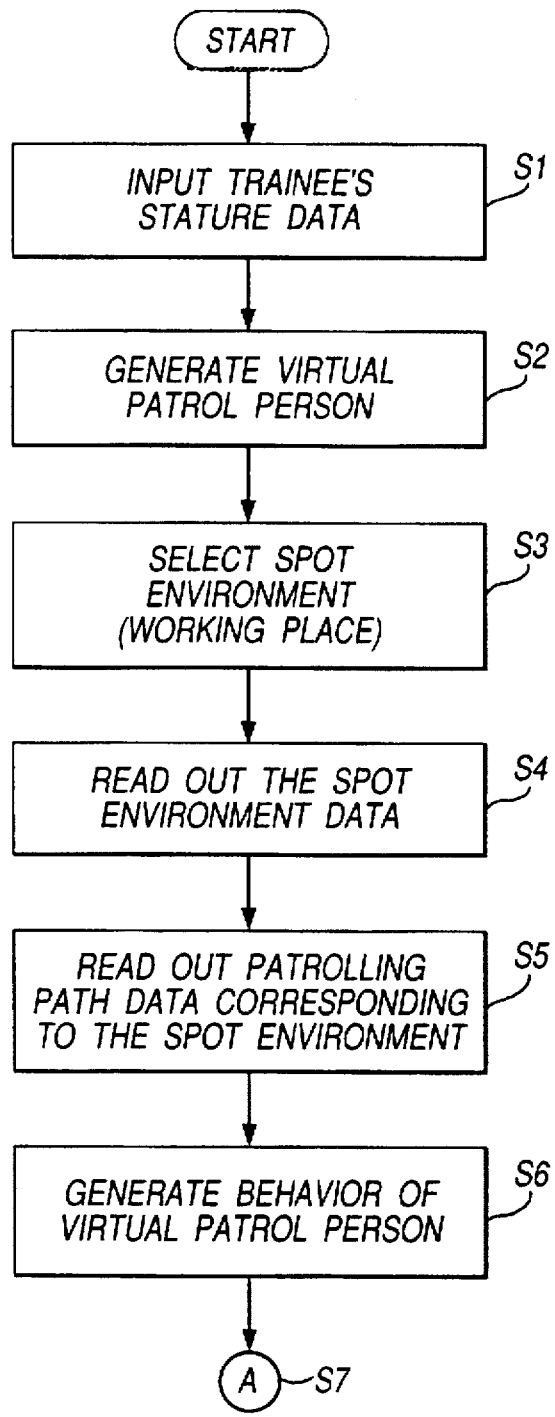
FIG. 15 and FIG. 16 are flow charts of a display method according to the first embodiment of the present invention.
Figure 16:
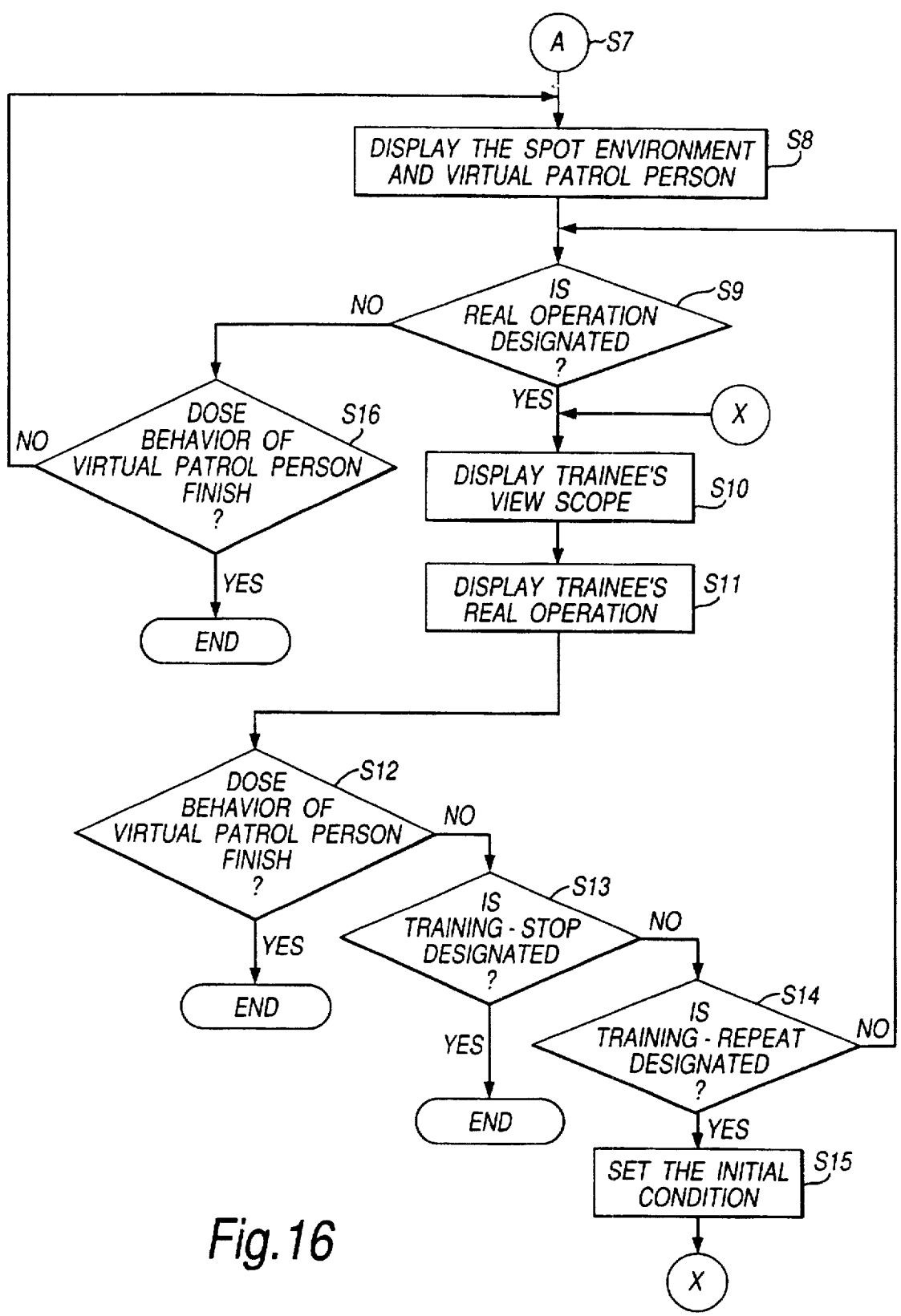

FIG. 15 and 16 are flow charts of processing of a display method according to the present invention. Firstly, user's anthropological data is supplied through the input section 1 by the user (trainee) (step(S1)). The virtual patrol person generation section 5 reads out element data (head, trunk, arm, leg) of the human model from the virtual patrol person memory section 6 and generates the human model by combining the elements in global coordinate space (step(S2)). In this case, the stature of the human model is reduced or expanded according to the anthropological data. Next, plural spot names of training (working place) are displayed as training candidates. The user selects a training spot (actually, patrolling area in power station or substation) through the input section 1 (step(S3)). The memory control section 15 reads out the spot environment data of the selected training spot from the spot environment memory section 2 (step (S4)), and reads out the patrolling path data from the patrolling path memory section 3 (step (S5)). The patrolling path generation section 10 generates the patrolling path along which the human model walks in global coordinate space according to the spot environment data and the patrolling path data (step(S6)). From this point, training begins because the human model data of the trainee and the patrolling path data are generated (step(S7)).

Figure 17:
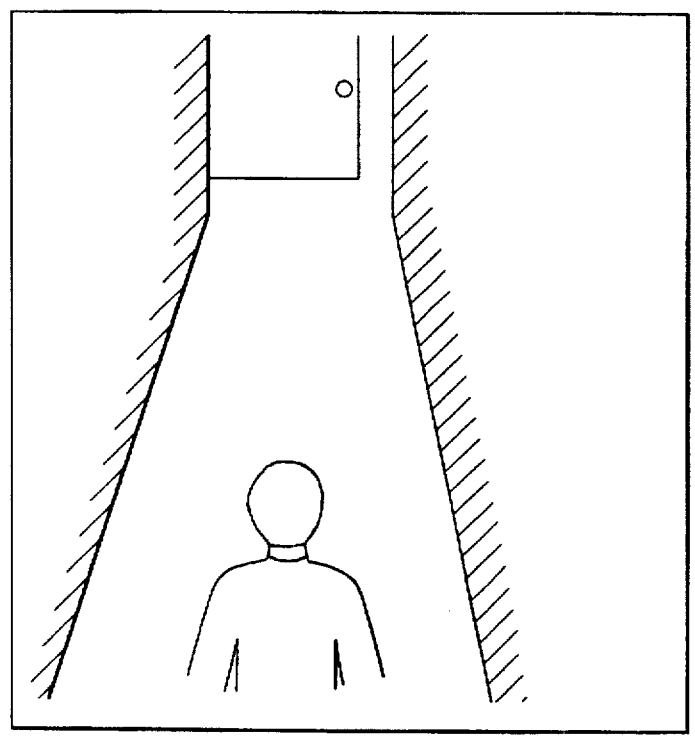
FIG. 17 is an initial scene in which the human model stands at a start point of the patrolling path.
Figure 18:
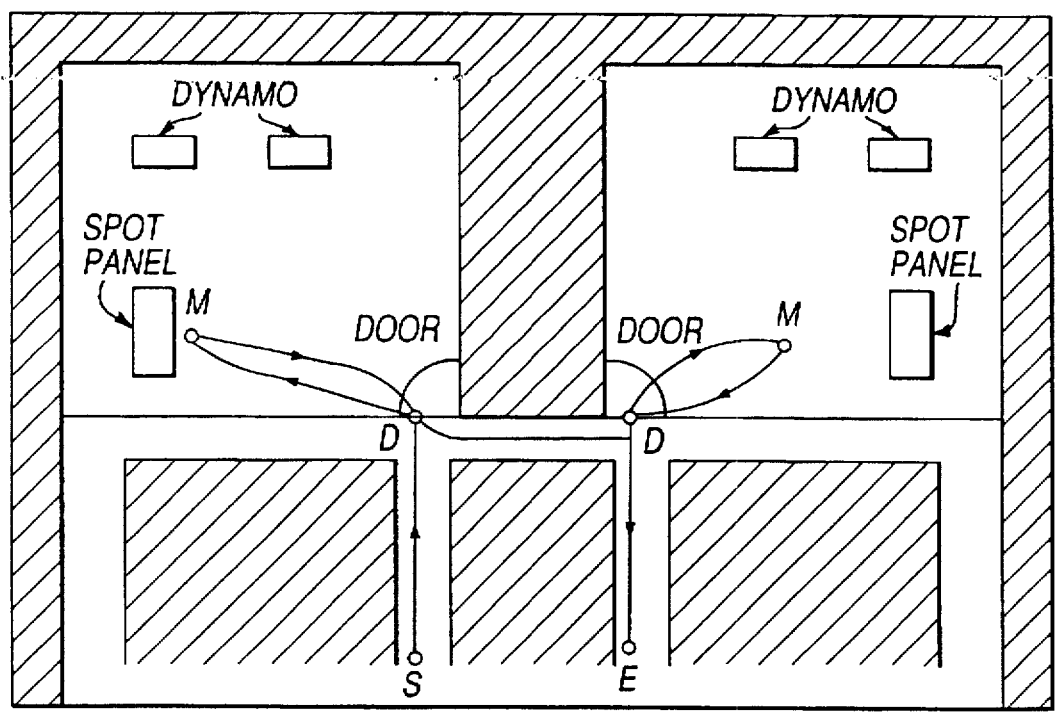
FIG. 18 is a plane map of the environment model.
Figure 19:
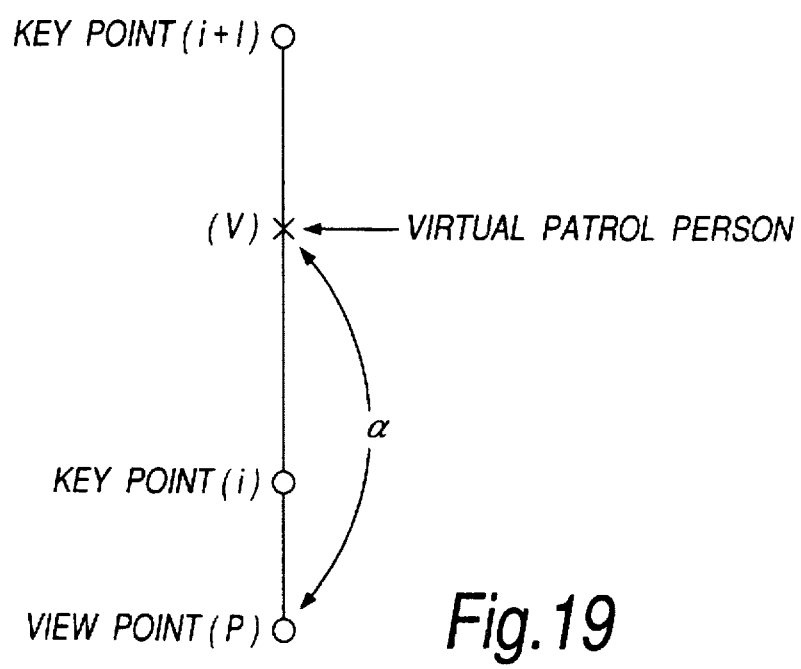
FIG. 19 is a plane map of a view point and view direction.

The display section 7 outputs the environment model including the patrolling path and the human model through the display control section 16 (step(S8)). FIG. 17 shows the initial scene in which the human model stands on the start point of the patrolling path. In this case, FIG. 18 shows the plane map of the environment model. In FIG. 18, the environment model includes two room in which two dynamos and one spot panel for controlling the dynamos are located respectively. In the plane map, "S" is the start point, "D" is the door point and "M" is the working place point in the same way of FIG. 3. The lines between these points are the patrolling path generated by the patrolling path generation section 10. The human model is positioned at start point (S). As shown in FIG. 17, the human model is walking toward the door (D). In this case, the scene (view scope) is displayed from view point behind the human model. FIG. 19 shows the plane map of the view scope. If the human model (V) is positioned between keypoint (i) and keypoint (i+1), view point (P) is positioned at a distance ($\alpha$) from the position of the human model (V) on the line. Direction of view line is a vector direction from keypoint (i) to keypoint (i+1).

Figure 20:
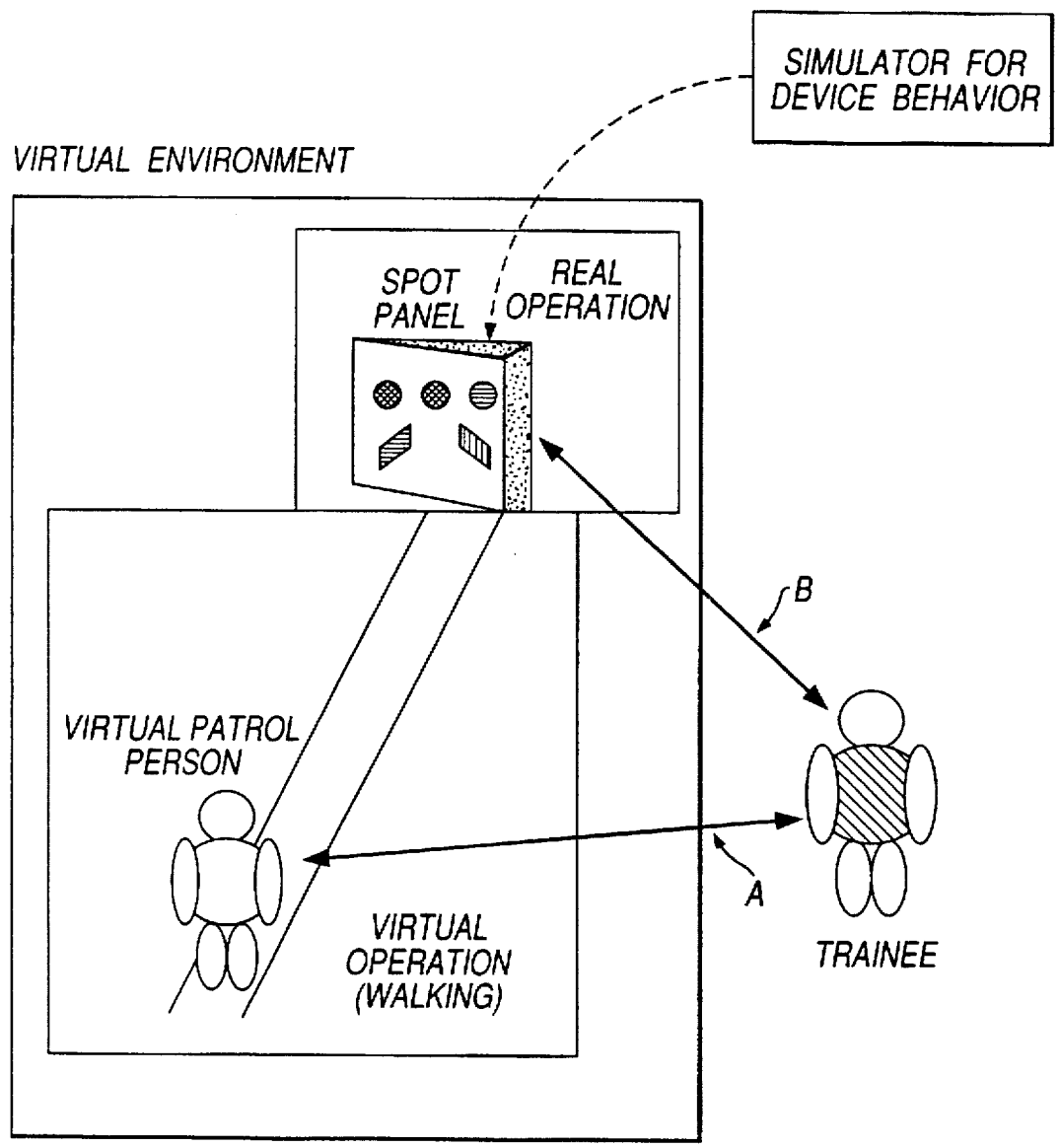
FIG. 20 is a schematic diagram of the relation between virtual operation and real operation.

In these ways, the human model passes through the door and walks to the spot panel (M) in the environment model according to the behavior generated by the virtual patrol person generation section 9. During this time, the change control section 8 decides whether the designation signal of real operation is input or not (step(S9)). If the designation signal is input, the change control section 8 controls the display control section 16 to change from displaying the human model's behavior to displaying the trainee's view scope (step (S10)). In short, before inputting the designation signal, the trainee watches the human model's behavior (walking along the patrolling path) in the virtual environment (as watching line A in FIG. 20). During this time, the trainee can learn walking along the path to the spot panel (It is called a virtual operation). When the human model reaches the spot panel on the display and the designation signal is inputted, the trainee watches the spot panel (without the human model) displayed from the trainee's view point (as watching line B in FIG. 20). During this time, the trainee can learn his actual operation for the spot panel on the display section 7 (step (S11)) (It is called a real operation).

To directly operate the spot panel, a position sensor of the HMD which the trainee wears detects the position and direction of the trainee. The detected position (X,Y,Z) of the trainee's head position is converted to trainee's eye position (x,y,z) by the following equation.

$$x=X$$
$$y=Y+a$$
$$z=Z+b$$

Parameters (a,b) for converting from head's position to eye's position is calculated before training. Then, the trainee's hand position or hand shake is recognized by the input section 1' (data-glove, magnetic-sensor) which the trainee puts on his hands. Accordingly, by converting from hand position or hand shake to operation signal, the trainee can operate on the spot panel.

Figure 21:
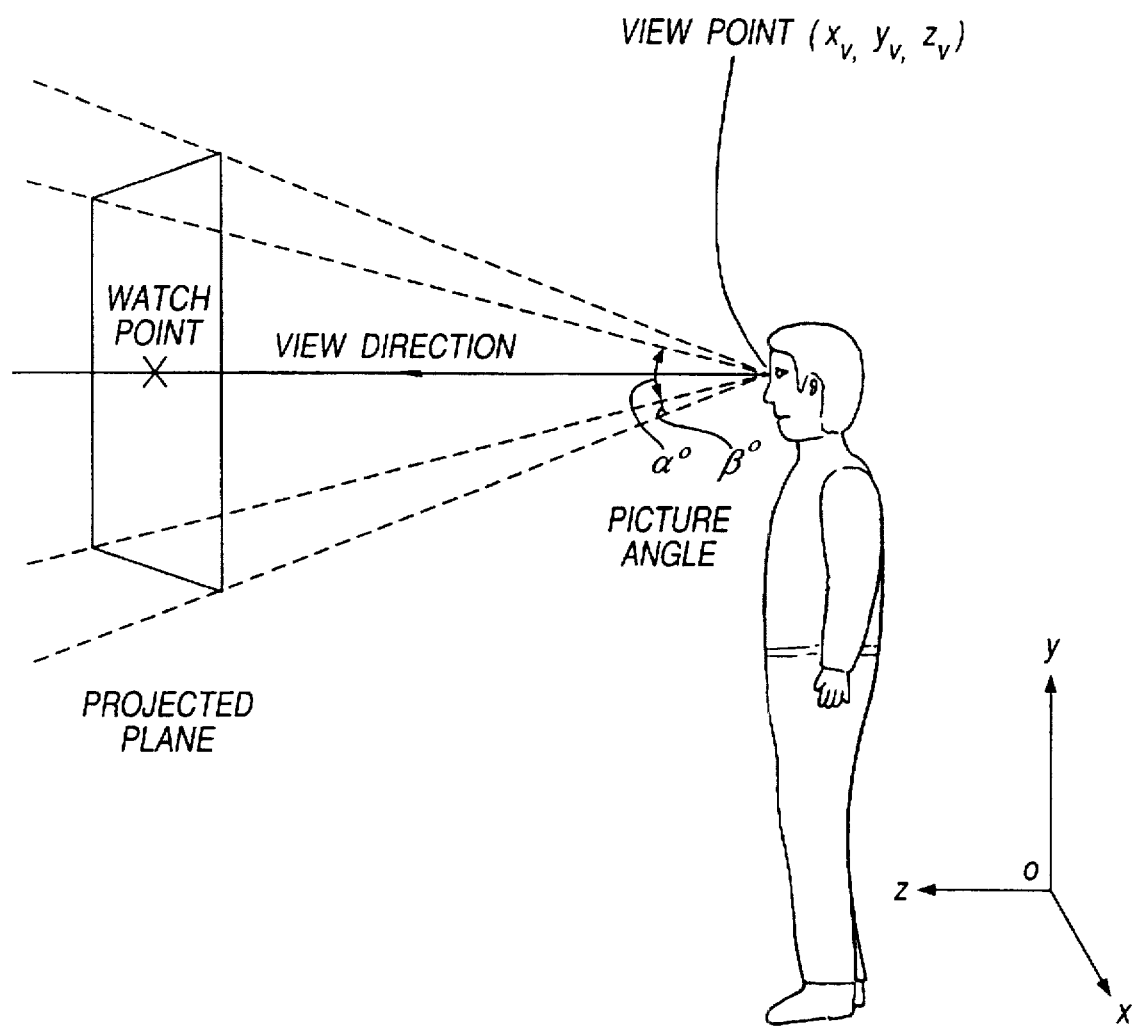
FIG. 21 is a schematic diagram of a view point and view direction of the trainee.
Figure 22:
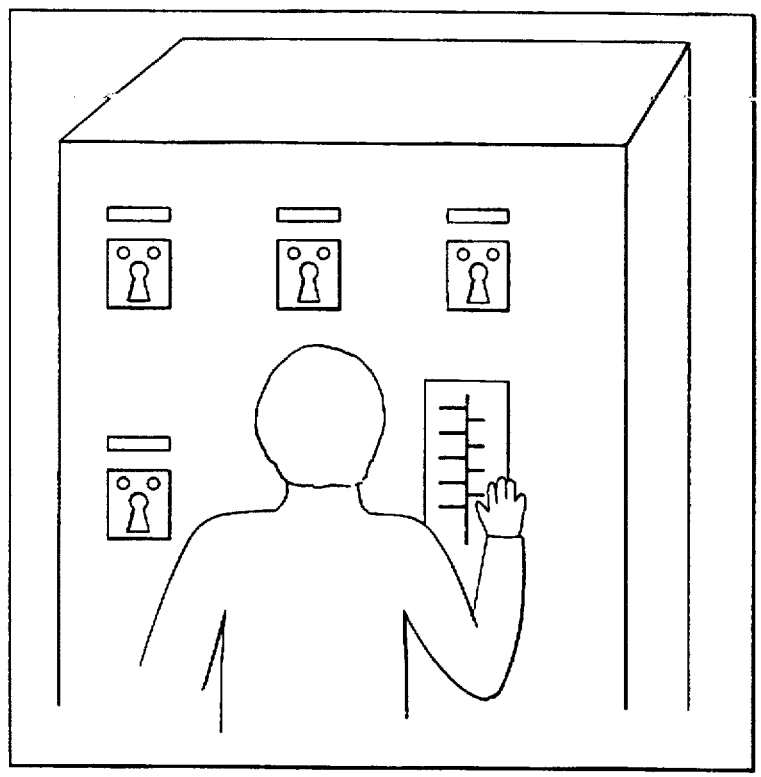
FIG. 22 is a schematic diagram of the spot panel and virtual patrol person on display.
Figure 23:
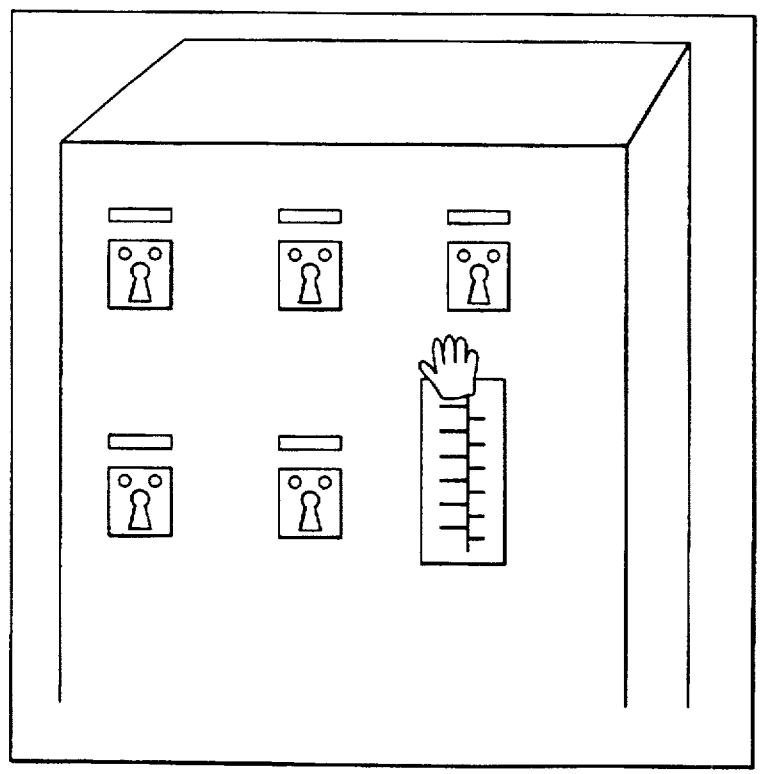
FIG. 23 is a schematic diagram of the spot panel on display.

In the real operation, the eye's position and direction is used as trainee's view point and view direction in case the spot panel is displayed on the display section 7 (step (S10)). FIG. 21 shows the scene from the view point and view direction of the trainee. First, according to the view point (Xv,Yv,Zv) and view direction, a picture angle ($\alpha°$, $\beta°$) is calculated in global coordinate space (X-Y-Z axis). Secondly, according to the picture angle ($\alpha°$, $\beta°$), the object (in this case, it is spot panel) is projected on the display screen. In short, the projected plane including the object is displayed as the trainee's view scope. For example, when the human model reaches the spot panel (M) on display, the trainee inputs the designation signal of changing to real operation through the input section 1. Before inputting the designation signal, the scene in which the human model faces the spot panel is displayed on the display section 7 as shown in FIG. 22. After inputting the designation signal, the spot panel without the human model is displayed from the trainee's view position as shown in FIG. 23. In short, the scene in which the trainee operates the spot panel by himself is displayed. In FIG. 23, a virtual hand is displayed on the spot panel. The virtual hand corresponds to the data-glove of the trainee, and moves on the spot panel by following the position and direction of the data-glove. Accordingly, the trainee can operate on the spot panel by moving the virtual hand on the display. Under this situation, the trainee executes various kinds of operation which imitate actual operation on the spot panel. It is necessary for the trainee to get an effect similar to actual operation. Therefore, each lever and meter are connected to the simulator for device behavior 11 which simulates action of various devices. In short, if the trainee operates the lever of the spot panel on display, situation of the lever is changed according to the object attribute data in FIG. 10. Then, the changed situation is sent to the simulator 11 through the memory control section 15. The simulator 11 calculates process corresponding to the changed situation of the lever, and the scale of the meter corresponding to the lever on display section 7 is changed according to the process. Then, if the trainee operates the spot panel correctly and the abnormal condition for the training is avoided, the simulator sends the information (abnormal condition is avoided) to the display control section 16.

At this timing, the display control section 16 decides that the training finishes (step (S12)). Alternatively, during the training, if the designation signal for stopping the training is supplied through the input section 1, the training finishes (step (S13)). If the designation signal is not supplied and another designation signal for repeating the training is not supplied (step (S14)), the training of trainee's real operation continues as it is (step (S9),(S10)). If the designation signal for changing from the real operation to the virtual operation is supplied (step (S9)), the behavior of the virtual patrol person is displayed until the virtual patrol person reaches the end point (point E in FIG. 18) of the patrolling path (step (S16),(S8)).

If the trainee cannot operate the spot panel correctly and the abnormal condition for the training is not avoided, information control section (not shown) informs the trainee to try the real operation again (step (S14)). In this case, the condition in the simulator 11 and the spot environment memory section 2 is reset to the condition at the time when the trainee designated the real operation (step (S15)), and the real operation is executed by the trainee again (step (S10)).

In the case the designation signal for changing to the real operation is not supplied when the virtual patrol person reaches the spot panel M.(step(S9)), the display section 7 continues to display the behavior of the virtual patrol person (step(S9)). In this case, the virtual patrol person operates the spot panel to avoid the abnormal condition by the virtual patrol person behavior generation section 9. The trainee can also learn the way of operation correctly by watching the virtual patrol person's operation on the display.

Figure 24:
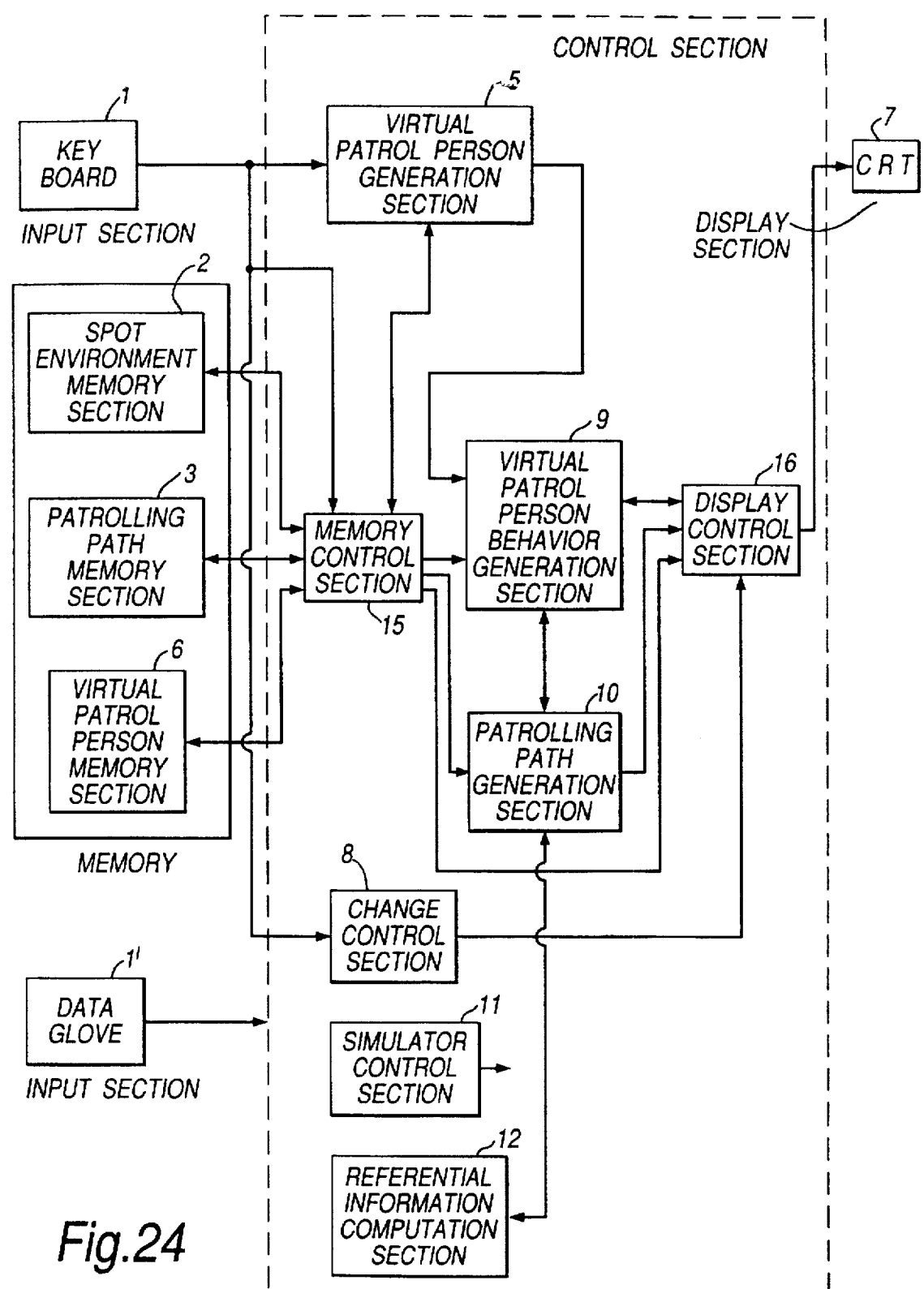
FIG. 24 is a block diagram of display apparatus according to a second embodiment of the present invention.

FIG. 24 is a block diagram of display apparatus according to a second embodiment of the present invention. In addition to the block diagram of the first embodiment, the block diagram of the second embodiment includes a referential information computation section 12 in FIG. 24. The referential information computation section 12 supplies the referential information for walking to the spot, such as a spot map, view space from view point of the trainee or the virtual patrol person.

Figure 25:
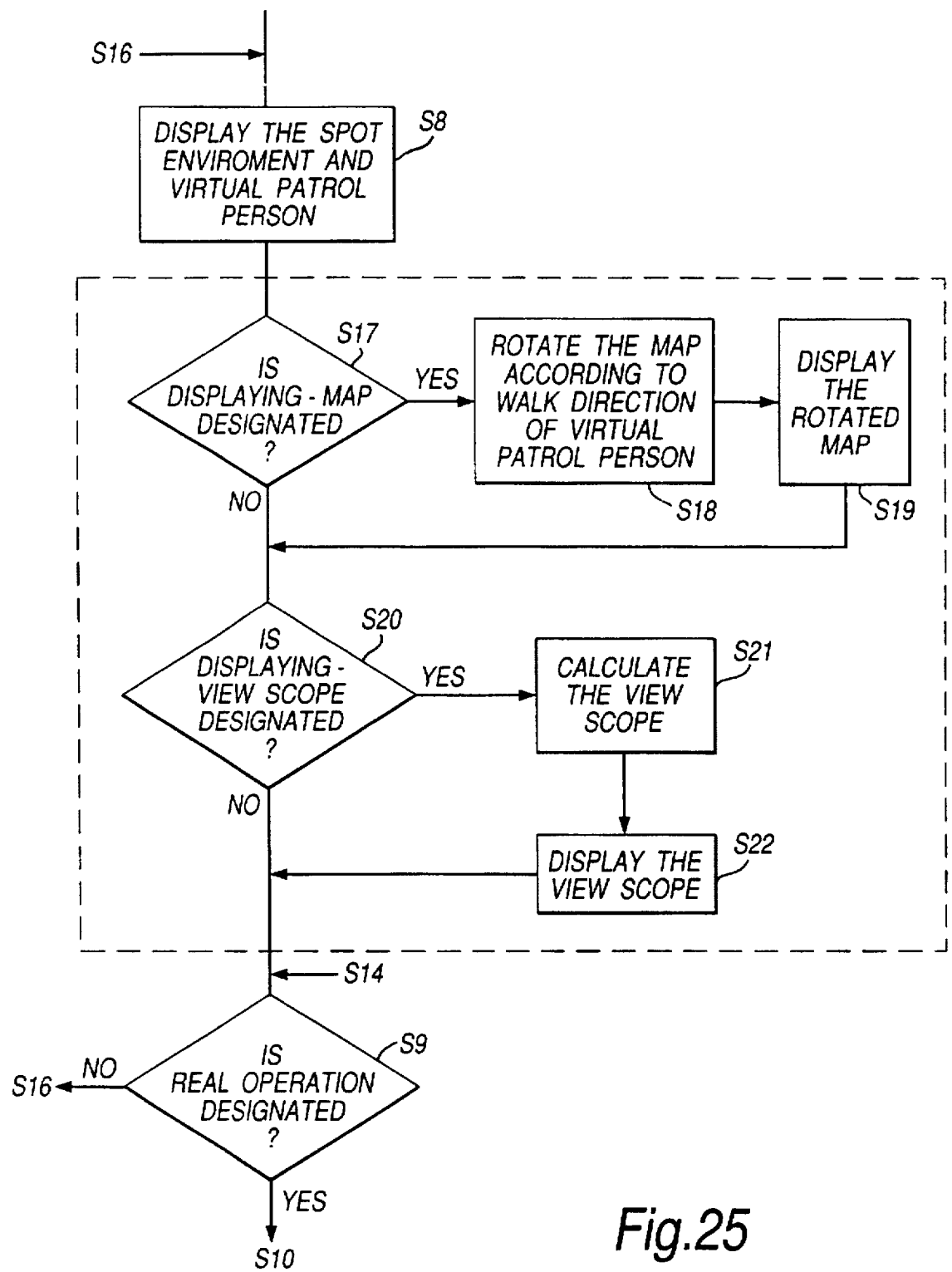
FIG. 25 is a flow chart of a display method according to the second embodiment of the present invention.

FIG. 25 is a flow chart of processing of the second embodiment. In FIG. 25, the dotted line part is processing of the referential information computation section 12. The dotted line part (step(S17)~(S22)) is added between step (S8) and step (S9) of the flow chart of FIG. 16.

After displaying the environment and the virtual patrol person as shown in FIG. 17 (step(S8)), if a designation signal for displaying a plane map as referential information is supplied (step(S17)), the plane map is rotated according to the walking direction of the virtual patrol person (step(S18)). The rotated plane map is displayed by the display section 7 (step(S19)).

Figure 26:
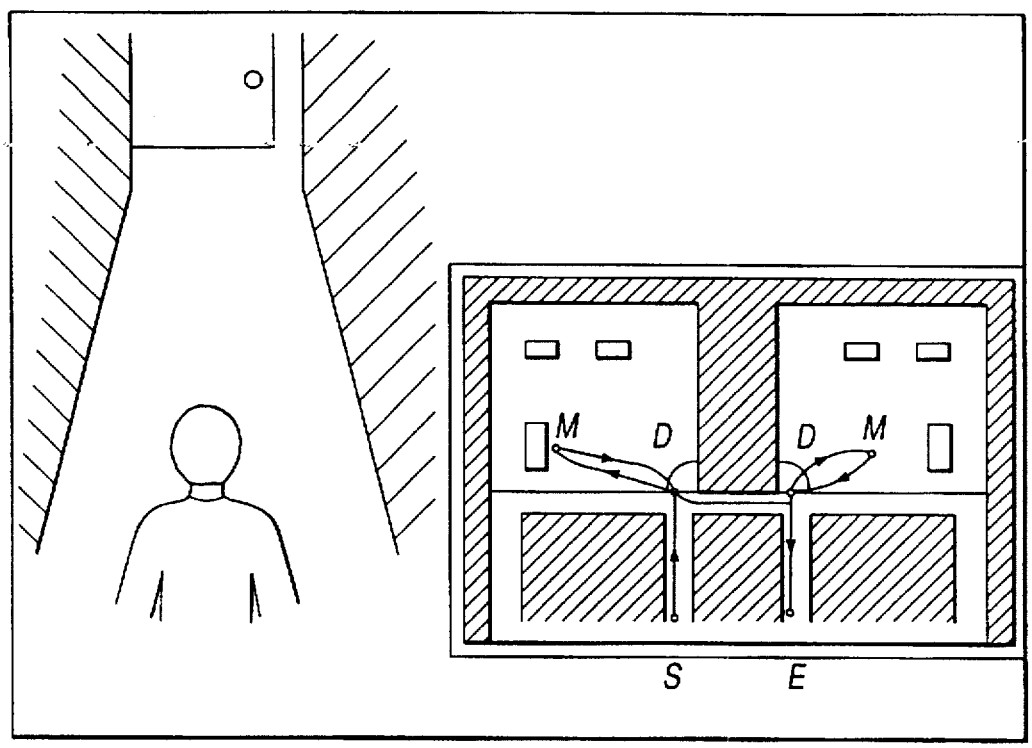
FIG. 26 is a schematic diagram of the patrolling path, virtual patrol person and plane map on display.
Figure 27:
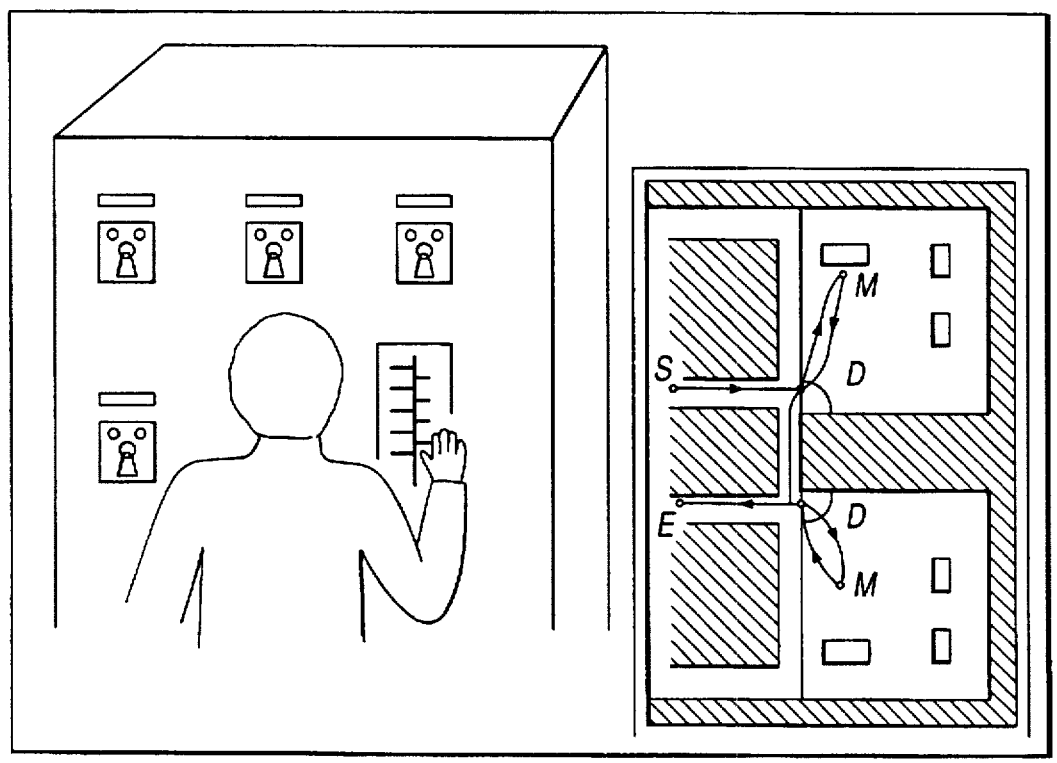
FIG. 27 is a schematic diagram of the spot panel, virtual patrol person and rotated plane map on display.

For example, it is assumed that the environment including the virtual patrol person is displayed as shown in FIG. 17. If the designation signal for displaying the plane map is supplied, the plane map of the environment including the patrolling path is displayed on a part of the display. On the plane map, the position of the virtual patrol person is displayed as a black point and a direction of the virtual patrol person is displayed as an arrow. In the case the environment including the virtual patrol person is displayed as shown in FIG. 22 and the designation signal is supplied, the plane map is rotated as 90° (step(S18)) because the walking direction of the virtual patrol person of FIG. 22 is rotated in comparison with the start walk direction of the virtual patrol person of FIG. 26, and the rotated plane map is displayed (step(S19)). FIG. 27 shows the display screen showing the environment including the virtual patrol person and the rotated plane map.

Figure 28:
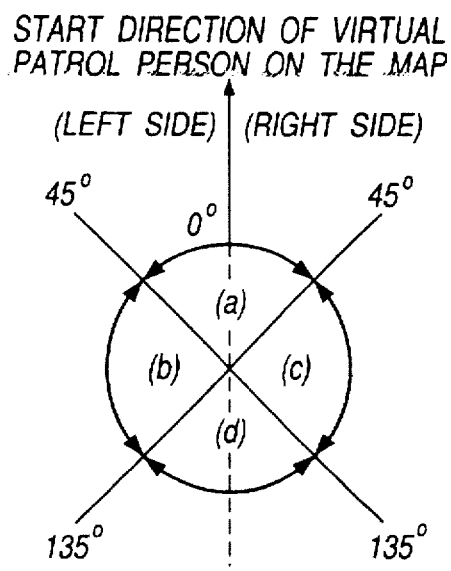
FIG. 28 is a schematic diagram of the relation between difference angle of walk direction and start direction of the map, and rotation angle of the plane map.

In this embodiment, if a difference angle between the walk direction of the virtual patrol person on the plane map and the start direction of the virtual patrol person on the plane map is larger than 45° the plane map is rotated by a unit of 90°. FIG. 28 shows the relation between the difference angle and the rotation angle of the plane map. The relation is comprised of four cases as follows.

(a) if the difference angle is not larger than 45° to the left side or right side of the start direction, the plane map is not rotated.

(b) if the difference angle is larger than 45° and not larger than 135° to the left side of the start direction, the plane map is rotated 90° to right side.

(c) if the difference angle is larger than 45° and not larger than 135° to the right side of the start direction, the plane map is rotated 90° to left side.

(d) if the difference angle is larger than 135° to the left side or right side, the plane map is rotated 180°.

Figure 29:
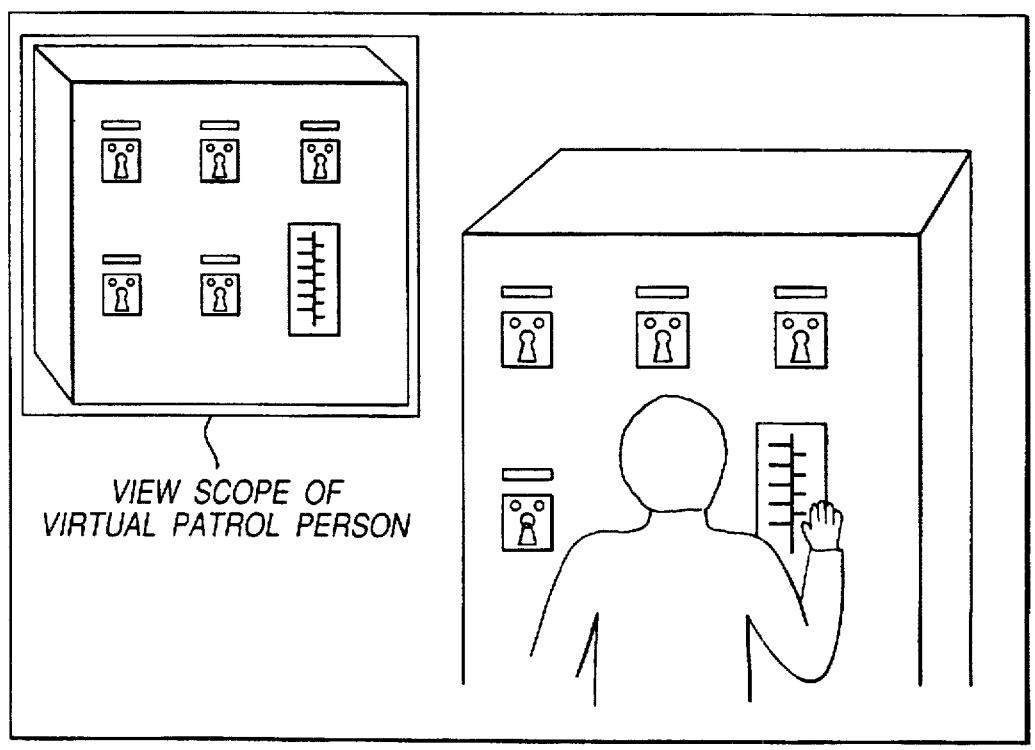
FIG. 29 is a schematic diagram of the spot panel, virtual patrol person and view scope on display.

Next, if the designation signal for displaying view scope of the virtual patrol person is supplied (step(S20)), the referential information computation section 12 calculates a triangular cone of view scope in which line between view point and watch point of the virtual patrol person is a central axis (step(S21)). For example, as shown in FIG. 21, the view point is the eye position of the virtual patrol person in global coordinate space, and watch point is calculated according to the view point and view direction. Therefore, if the picture angle is assumed as 20°, the triangular cone of view scope is formed and a projected plane in the triangular cone is displayed on the display section 7 (step(S22)). The projected plane in the cone is a scene which the virtual patrol person watches. In this case, the stature of the virtual patrol person corresponds to the trainee's stature. Therefore, the projected plane corresponds to view scope of the trainee. For example, if the designation signal for displaying the view scope is supplied on the display shown in FIG. 22, the view scope of the virtual patrol person is displayed as shown in FIG. 29. As mentioned above, the view scope of the virtual patrol person is calculated according to the position of the virtual patrol person in the environment model of global coordinate space. Therefore, the trainee can learn the distance-feeling and presence-feeling as if he actually walks in the environment.

Figure 30:
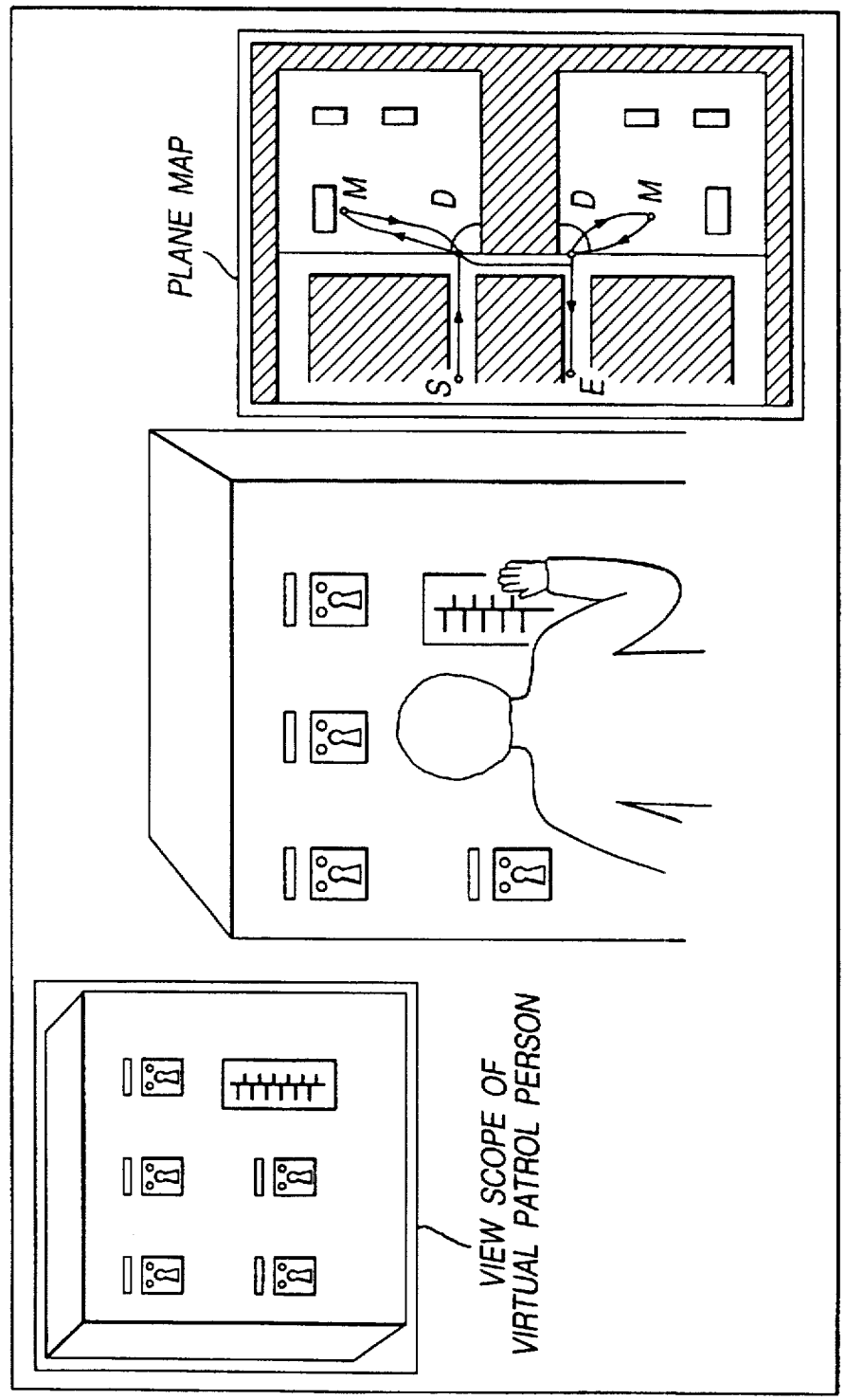
FIG. 30 is a schematic diagram of the spot panel, virtual patrol person, view scope and rotated plane map on display.

If the designation signal is for displaying both plane map and view scope on the display shown in FIG. 22, the plane map and the view scope are displayed as shown in FIG. 30. The trainee can learn not only the position of the patrolling path on the plane map but also the view scope of a key point in the environment. Accordingly, even if the trainee goes to the working place first, he can reach the spot correctly.

A third embodiment relates a user's understanding between a direction of his walk on a ground map (plane map) and an actual view scope of the direction of his walk on the ground correctly. In short, the view scope corresponding to the user's stature (scene which the user will see when he walks on the ground actually) is displayed at a keypoint on the plane map. Therefore, he cannot lose sight of the key point when he actually walks on the ground.

Figure 31:
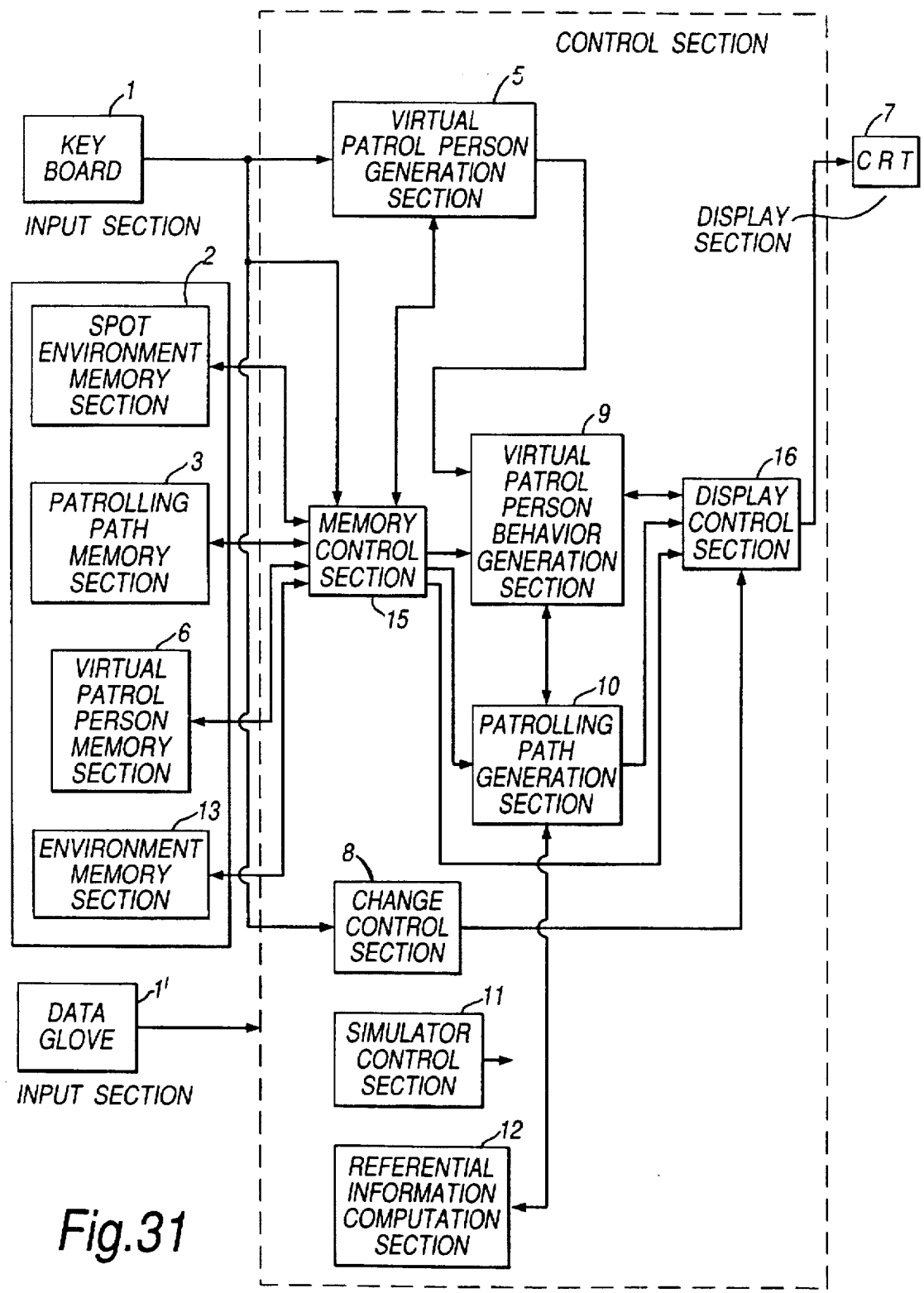
FIG. 31 is a block diagram of display apparatus according to a third embodiment of the present invention.

FIG. 31 is a block diagram of display apparatus according to the third embodiment of the present invention. This block diagram is the same as that of the second embodiment except for an environment memory section 13. FIG. 32 shows a format of environment data stored in the environment memory section 13. As shown in FIG. 32, the environment data is comprised of plural divisions (1, 2, . . . ). In each division, peak coordinates of the polygon which the division is projected to X-Z plane are stored clockwise (as two-dimensional division). The number of peak points is not fixed. Therefore, the last peak coordinate of each division stores "Null". In FIG. 32, division 1 includes four peak points and division 2 includes five peak points. If the peak coordinate is lifted in the Y-direction on the plane map, the actual image data which is put on a side face of the three-dimensional division is necessary. Therefore, a pointer to image data is stored by unit of peak coordinate. In FIG. 32, as for a face which is formed by the peak point (X11,Z11) and the peak point (X12,Z12) (whose height is normalized to "α"), a pointer to image data which is put on the face is p11 corresponding to the peak point (X11,Z11). In the same way, a pointer to image data which is put on a face formed by peak point (X14,Z14) and peak point (X11, Z11) is P14 corresponding to the peak point (X14,Z14). Pointer P10 to image data corresponding to last peak point "Null" is a pointer to a plane image of the division (1) including all buildings and so on. In FIG. 32, the plane image of division (1) as plane map is stored at pointer P10.

Figure 33:
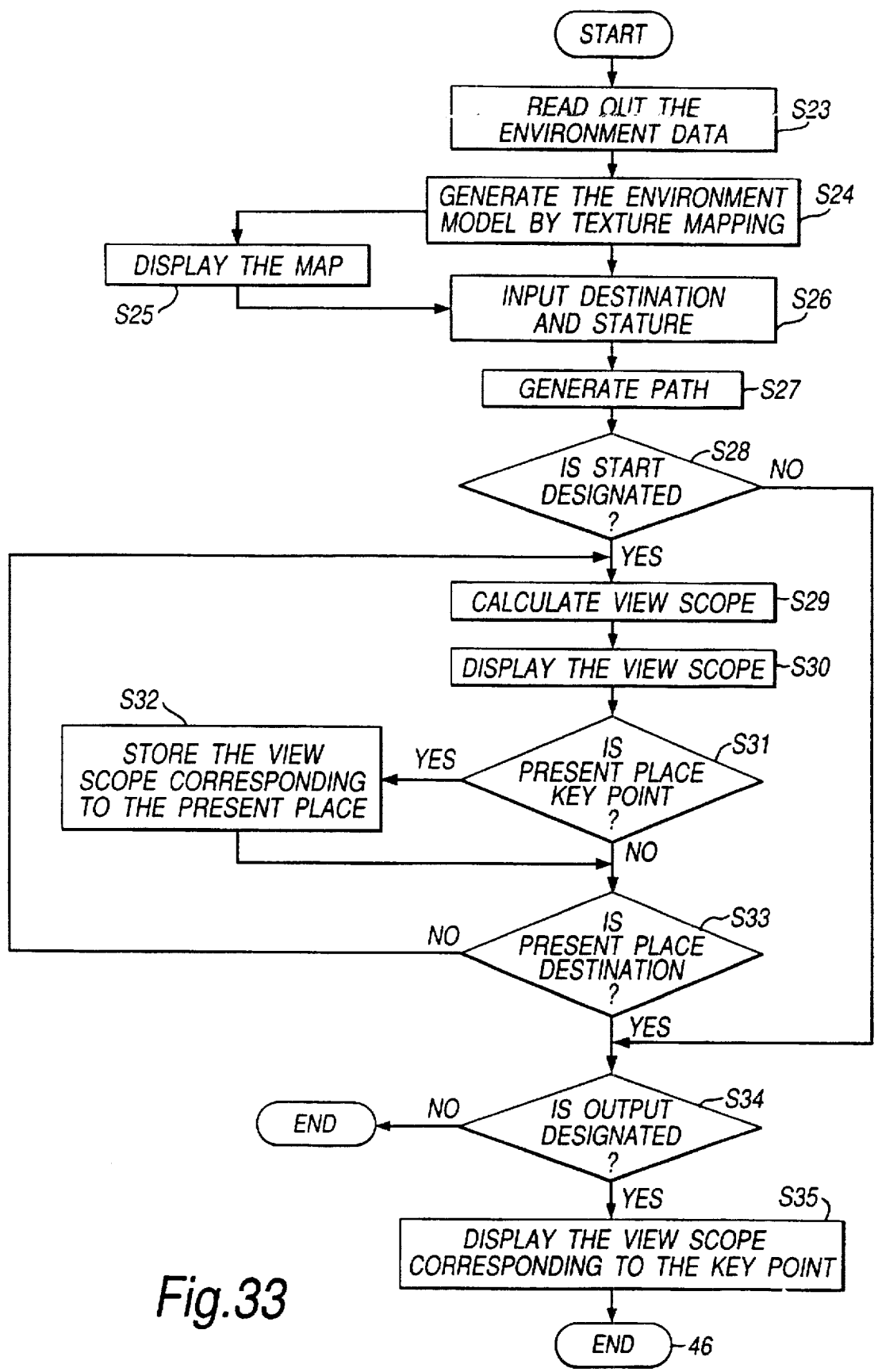
FIG. 33 is a flow chart of a display method according to the third embodiment of the present invention.

FIG. 33 is a flow chart of a display method according to the third embodiment of the present invention. The memory control section 15 reads out the environment data (shown in FIG. 32) from the environment memory section 13 (step (s23)), and generates the environment data by putting on image data for each face of division. This method is called "texture mapping". Texture mapping is shown in "Computer Graphics:Principles and Practice", pp.1100–1102, incorporated herein by reference.

In FIG. 32, four peak points of the first face of the division (1) are (X11, 0, Z11), (X11, α, Z11), (X12, α, Z12), (X12, 0, Z12) if the height is "α". The image data, which is stored in pointer P11, is put on the first face by transforming coordinates (it is called texture mapping). The texture mapping is executed on five faces of each division.

Next, the display section 7 displays the plane map of each division through the display control section 16 (step(s25)). First, a boundary line of each division area is drawn on the display according to peak points of each division shown in FIG. 32. Then, a plane image corresponding to pointer P10 is put on the division (1) area and a plane image corresponding to pointer P20 is put on the division (2) area on the display.

Figure 34:
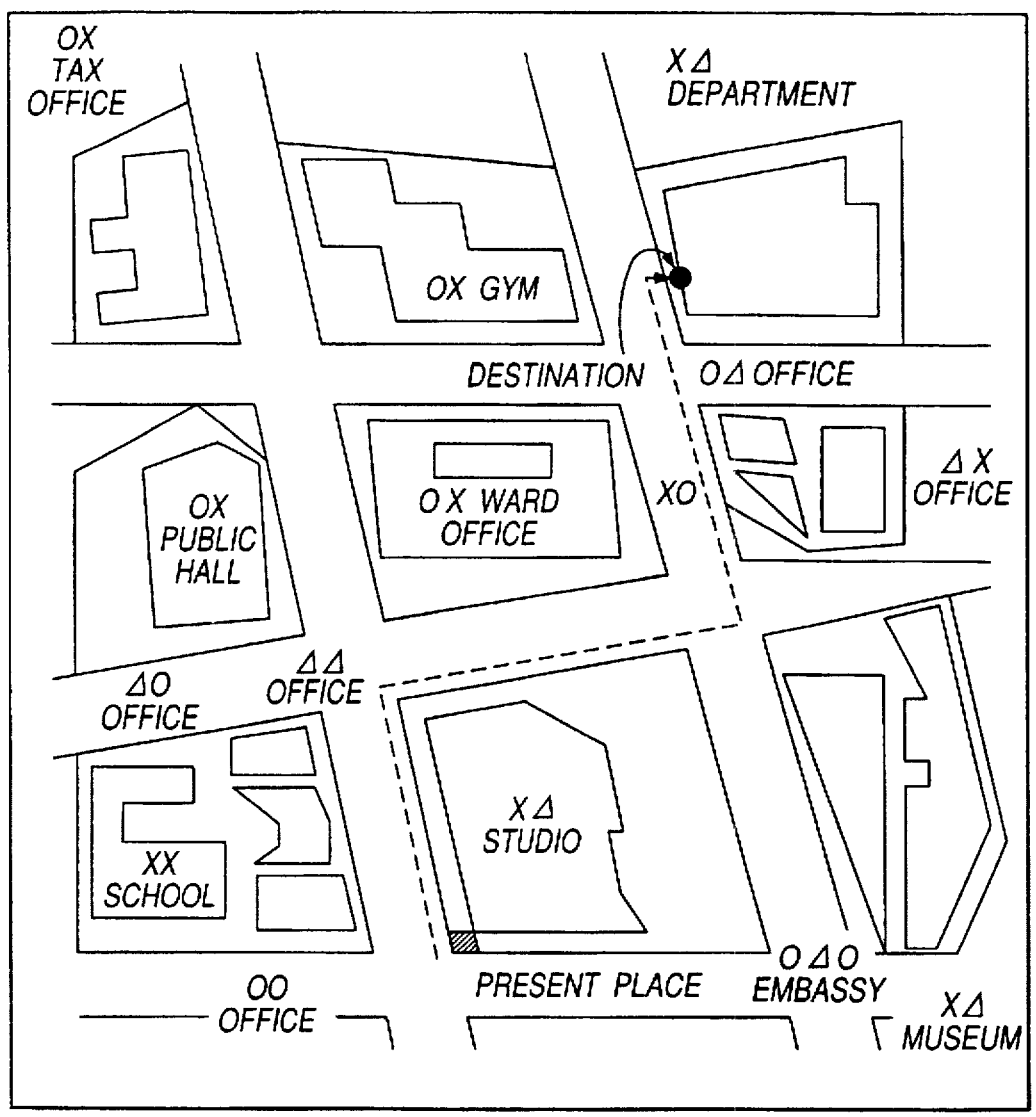
FIG. 34 is a schematic diagram of a plane map of a division on display.

In short, in the example of FIG. 32, the boundary line of division (1) is drawn by linking peak points (X11, Z11) (X12, Z12) (X13, Z13) (X14, Z14) on the display. Then, the plane map image corresponding to pointer P10 is put on the division (1) area. As a result, the plane map including each division area is displayed on the display section 7 as shown in FIG. 34.

Next, the user inputs a destination and his stature through the input section 1 (step(s26)). As the input of destination, the user can directly designate on the plane map by using a pointing device (ex. mouse). The user can also designate by inputting destination's name through the keyboard.

The patrolling path generation section 10 generates the path in the same way as in the first embodiment (step(s27)). Now, it is assumed that "X Δ department" is designated as the destination on display shown is FIG. 34. In this case, the path from start point to destination point is drawn as a dotted line on the plane map.

Next, when the start signal is supplied (step(s28)), the map-guidance (displaying the environment image) begins.

Figure 36:
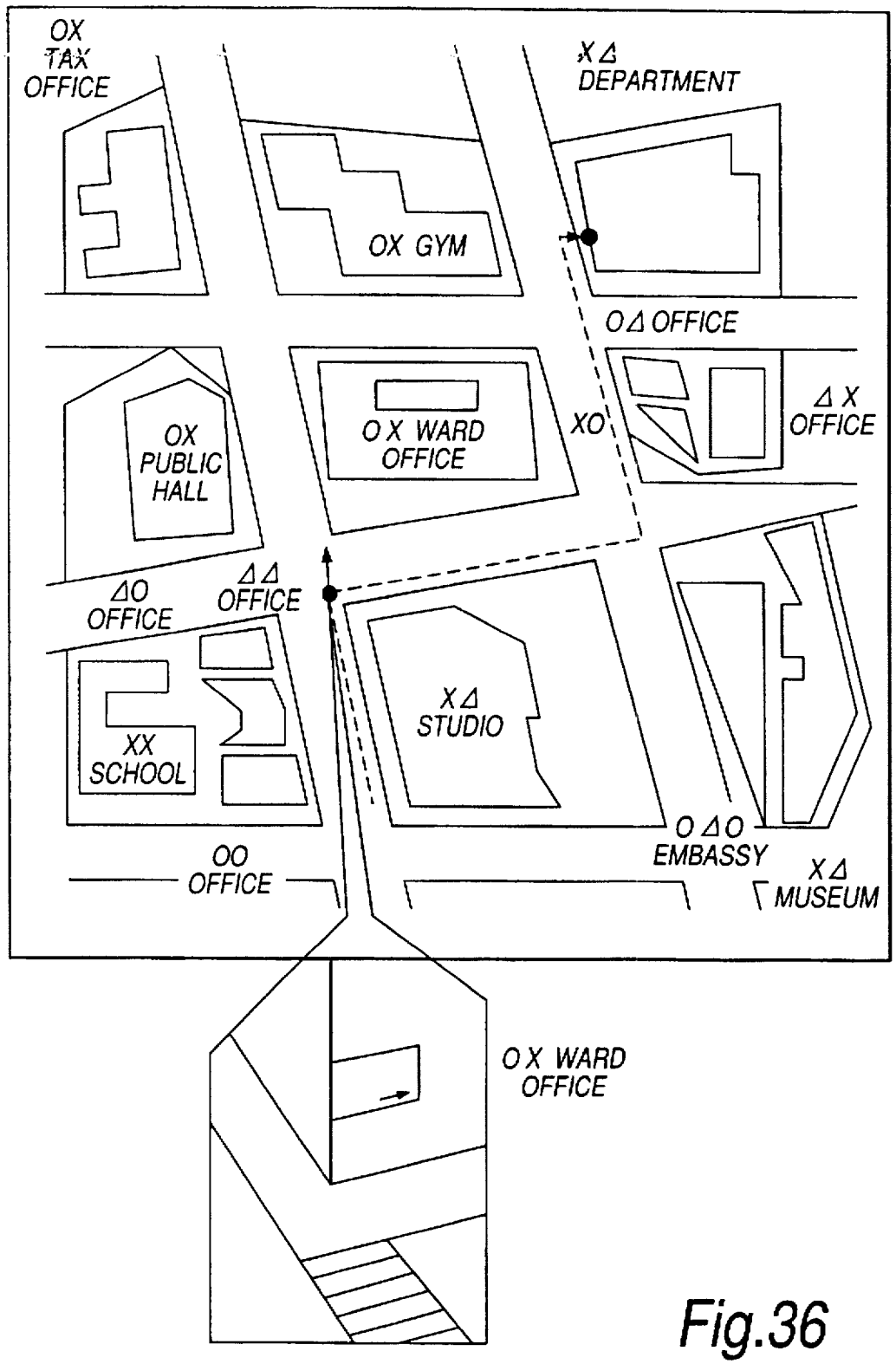
FIG. 36 is a schematic diagram of a plane map and a view scope corresponding to a key point.
Figure 37:
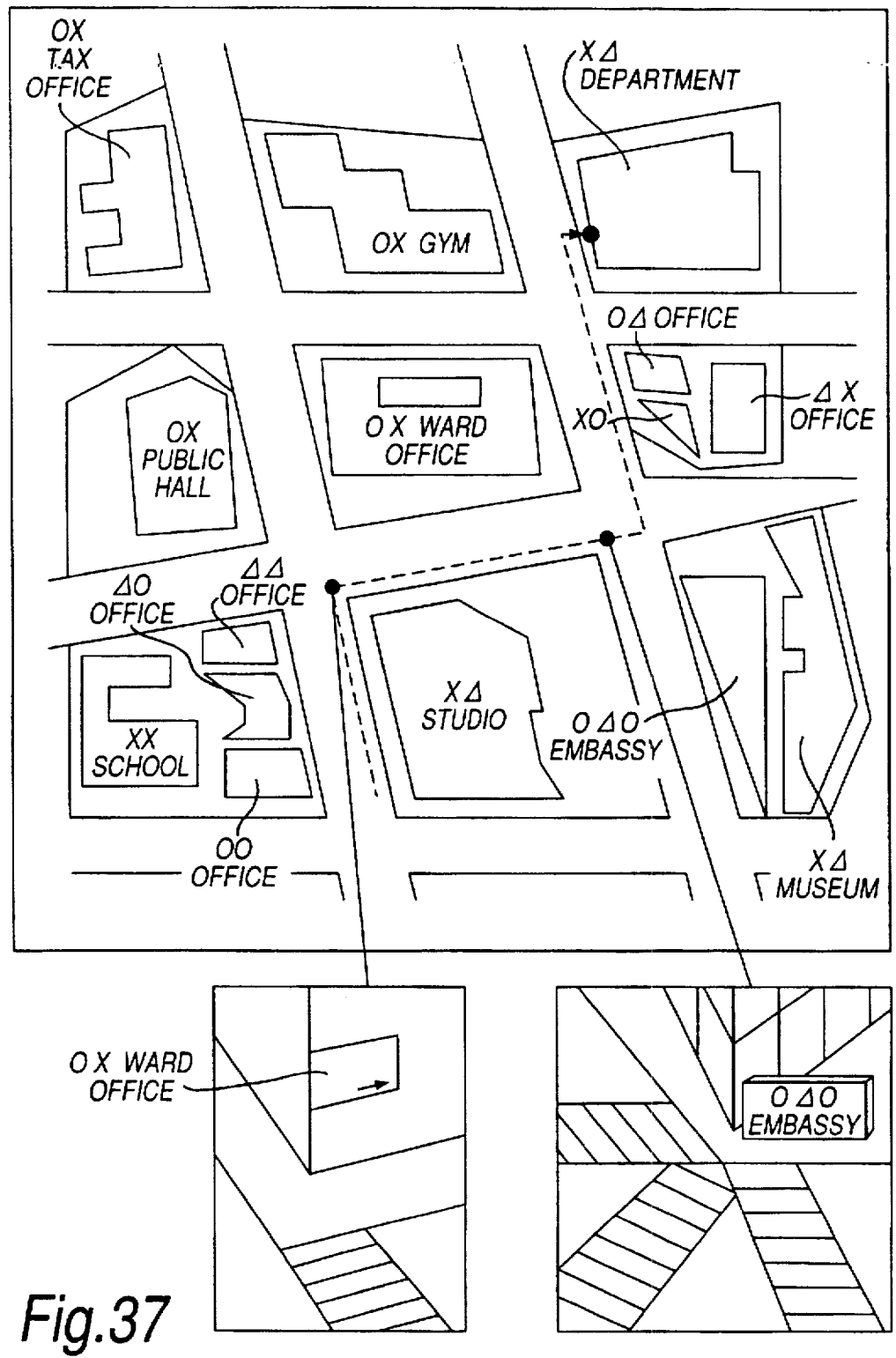
FIG. 37 is a schematic diagram of a plane map and two view scopes corresponding to two key points.

The referential information computation section 12 calculates view scope which user sees when he walks along the path (step(s29)). In this case, the view scope is calculated by user's stature on each point along the path. (This method for calculating view point is similar to that of the second embodiment.) The view scope is displayed on the display section 7 as shown in FIG. 35 (step(s30)). The present point is drawn as black point with arrow on the path. The view scope, which user watches when he stands on black point position of the ground actually, is displayed on the lower part of the display. The view scope corresponds to the black point on the display. Accordingly, the view scope is updated at predetermined intervals according to advance of the black point along the path. When the black point advances to the key point (ex. corner of the division) along the path on the map (step(s31)), the view scope and corresponding key point (coordinate value) are temporarily stored in the referential information computation section 12 (step(s32)). For example, the view scope corresponding to black point between "OX ward office" and "X Δ studio" is displayed on lower part of the map as shown in FIG. 36. In this case, the view scope is temporarily stored in the referential information memory section 12 because the view scope corresponds to a key point of corner. The same processing is repeated until the black point reaches the destination along the path on the map (step(s33)). When the black point reaches the destination, the map-guidance finishes. At this time, if the user designates the output of the view scope (step(s34)), the view scope corresponding to the key point is read from the referential information memory section 12 and displayed on the display section 7. In this case, as shown in FIG. 37, the view scope corresponds to each key point on the map (step(s35)). If the user has the map shown in FIG. 37 during his walking along the path, he can compare actual scene with view scope of the map. Therefore, he can easily decide whether he is walking in the correct direction between the divisions on the ground.

In the case that the map-guidance is not started (step(s28)) and output of plane map is only designated, the map shown in FIG. 34 is only displayed. FIG. 32 shows the storing format of the map as the image data of each division. However, as the storing format, a head address of the list consisting of position coordinate and name code of building in each division may be stored by unit of division. In this case, the list is accessed by using the head address from the memory, and the building and the name are drawn in the division area of the map on display.

In step (s24) of FIG. 33, texture mapping is executed on five faces of each division to generate the environment model of the map. However, texture mapping may be executed only on the neighboring side along the path. In short, texture mapping is executed only in the area which the user sees during his walk along the path to the destination. In this case, process-load of texture mapping is able to be reduced in comparison with the above-mentioned method.

Additional advantages and modifications will readily occur to those skilled in the art. The invention in its broader aspects is therefore not limited to the specific details, representative apparatus and method, and illustrative examples shown and described. Accordingly, departures may be made from such details without departing from the spirit or scope of the general inventive concept. Thus, it is intended that this invention cover the modifications and variations of the invention provided they are within the scope of the appended claims and their equivalents.

What is claimed is:

1. A virtual environment display apparatus for displaying behavior of a human model in an environment model, comprising;

memory means for storing data representing the environment model, data representing the human model, data representing a patrolling path in the environment model, and data representing a map corresponding to the environment model, wherein the map includes a patrolling path line from start point to end point;

display means for displaying behavior of the human model in the environment model, wherein the behavior includes the human model walking along the patrolling path;

input means for inputting a designation signal for displaying the map;

referential information calculation means for rotating the map according to a walk direction of the human model in response to the designation signal; and control means for displaying the rotated map through said display means, wherein the patrolling path line on the rotated map includes a human model point corresponding to a human model position.

2. The virtual environment display apparatus according to claim 1, wherein the environment model data includes position data, object figure data, object attribute data and object connection data; wherein the position data includes a position of each object in global coordinate space, the object figure data includes detailed figure data for each kind of object in local coordinate space, the object attribute data includes simulation data corresponding to an operation signal for each kind of object, and the object connection data includes a subordinate relation between objects.

3. The virtual environment display apparatus according to claim 1, wherein the human model data includes element position data, connection order data and behavior data; wherein the element position data includes a peak coordinate of each element of the human model in local coordinate space, the connection order data includes connection points between elements being connected each other, the behavior data includes a rotation angle of each element around a local coordinate axis when the human model walks in local coordinate space.

4. The virtual environment display apparatus according to claim 1, wherein the patrolling path data includes coordinates of key points along the patrolling path.

5. The virtual environment display apparatus according to claim 1, further including virtual patrol person generation means for generating the human model as a virtual patrol person according to the human model data, and for modifying the human model according to the user's anthropological data.

6. The virtual environment display apparatus according to claim 5, further including behavior generation means for generating behavior data of the human model walking along the patrolling path according to the environment model data, patrolling path data and human model generated by said virtual patrol person generation means.

7. The virtual environment display apparatus according to claim 6, wherein said display means displays the behavior of the human model in the environment model from a view point of a back of the human model relative to a walking direction along the patrolling path.

8. The virtual environment display apparatus according to claim 7, wherein said display means includes means for displaying the environment model without the human model when the designation signal for changing is input through said input means during displaying of behavior of the human model in the environment model.

9. The virtual environment display apparatus according to claim 8, further includes simulator means for simulating behavior of an object according to object attribute data when an operation signal is input through said input means during display of the selected portion; wherein said display means displays the simulation result.

10. The virtual environment display apparatus according to claim 1, wherein the referential information calculation means calculates a view scope from user view point in the environment model when a third designation signal for displaying the view scope is input through said input means, and for displaying the view scope through said display means.

11. The virtual environment display apparatus according to claim 1, wherein:
said input means inputs a second designation signal when the human model reaches a selected portion of the environment model during displaying of the human model walking along the path, wherein the selected portion is an object to be simulated; and
said control means changes a display status of said display means from the behavior of the human model to the selected portion in response to the second designation signal.

12. The virtual environment display apparatus according to claim 11, wherein said input means further inputs an operation signal for simulating behavior of the selected portion during displaying of the selected portion, a simulation result being thereby displayed by said display means.

13. A virtual environment display method for displaying behavior of a human model in an environment model, said method comprising the steps of:
displaying behavior of the human model in the environment model, wherein the behavior includes the human model walking along a patrolling path according to prestored environment model data, human model data and patrolling path data;
inputting a designation signal for displaying a map according to prestored map data corresponding to the environment model, wherein the map includes a patrolling path line from start point to end point;
rotating the map according to a walk direction of the human model in response to the designation signal; and
displaying the rotated map, wherein the patrolling path line on the rotated map includes a human model point corresponding to a human model position.

14. The virtual environment display method of claim 13, further comprising:
inputting a designation signal when the human model reaches a selected portion of the environment model during displaying of the human model walking along the path, wherein the selected portion is an object to be simulated;
displaying the selected portion instead of the behavior of the human model according to the designation signal;
inputting an operation signal for simulation of the selected portion;
simulating behavior of the selected portion according to the operation signal; and
displaying a simulation result of the behavior of the selected portion.

15. A virtual environment display apparatus for displaying a map including a path from a start point to an end point, comprising;
memory means for storing environment data by unit of block of the map, wherein the environment data of each block includes a peak coordinate of the block on a two-dimensional plane, side image data and plane image data of the block, the side image data corresponds to each side face of the block in three-dimensional space, the plane image data corresponds to a plane face of the block on the map;
input means for inputting a user's stature data;
display means for displaying the map including the path according to the peak coordinate of each block, wherein the plane image data is displayed for each block on the map; and
control means for calculating a view point corresponding to the user's stature data on the map and for generating a view scope image according to the view point, a movement direction along the path and the side image data of the block corresponding to the view point along the path;
wherein said display means displays the view scope image according to the movement direction along the path on the map.

16. The virtual environment display apparatus according to claim 15, wherein said display means includes means for displaying the user's position moving along the path on the map, and for displaying the view scope image corresponding to the user's position on the map.

17. A virtual environment display apparatus for displaying a map including a path from a start point to an end point, comprising;
memory means for storing environment data by unit of block of the map, wherein the environment data of each block includes a peak coordinate of the block on a two-dimensional plane, side image data and plane image data of the block, the side image data corresponds to each side face of the block in three-dimensional space, the plane image data corresponds to a plane face of the block on the map;
input means for inputting a user's stature data;
display means for displaying the map including the path according to the peak coordinate of each block, wherein the plane image data is displayed for each block on the map; and
control means for calculating a view point corresponding to the user's stature data on the map and for generating a view scope image according to the view point, a movement direction along the path and the side image data of the block corresponding to the view point along the path;
wherein said display means displays the view scope image according to the movement direction along the path on the map, and wherein said control means includes means for storing the view scope image corresponding to a key point along the path until the user's position reaches the end point along the path on the map.

18. The virtual environment display apparatus according to claim 17, wherein said display means includes means for displaying the view scope image corresponding to the key point with the map when a designation signal for displaying the view scope image is input through said input means.

19. A virtual environment display method for displaying a map including a path from a start point to an end point, said method comprising the steps of:
inputting user's stature data;
displaying the map including the path according to prestored peak coordinate and plane image data of each block on the map, wherein the peak coordinate on two-dimensional plane, the plane image data and side image data comprise environment data by unit of block on the map, the side image data corresponds to each three-dimensional side face of the respective blocks, the plane image data is displayed for each block on the map;

calculating a view point corresponding to the user's stature data on the map;

generating a view scope image according to the view point, a movement direction along the path and the side image data of the block corresponding to the view point along the path; and displaying the view scope image according to the movement direction along the path on the map.

20. A computer readable memory containing computer readable instructions, comprising:

first instruction means for causing a computer to display behavior of a human model in an environment model, wherein the behavior includes the human model walking along a patrolling path according to prestored environment model data, human model data and patrolling path data;

second instruction means for causing the computer to input a designation signal for displaying a map according to prestored map data corresponding to the environment model, wherein the map includes a patrolling path line from start point to end point;

third instruction means for causing the computer to rotate the map according to a walk direction of the human model in response to the designation signal; and fourth instruction means for causing the computer to display the rotated map, wherein the patrolling path line on the rotated map includes a human model point corresponding to a human model position.

21. A computer readable memory containing computer readable instructions, comprising:

first instruction means for causing a computer to input a user's stature data;

second instruction means for causing the computer to display a map including a path from a start point to an end point according to prestored peak coordinate and plane image data of each of a plurality of blocks on the map, wherein the peak coordinate on two-dimensional plane, the plane image data and side image data comprise environment data by unit of said blocks on the map, the side image data corresponds to each three-dimensional side face of the respective blocks, the plane image data is displayed for each block on the map;

third instruction means for causing the computer to calculate a view point corresponding to the user's stature data on the map;

fourth instruction means for causing the computer to generate a view scope image according to the view point, a movement direction along the path and the side image data of the block corresponding to the view point along the path; and fifth instruction means for causing the computer to display the view scope image according to the movement direction along the path on the map.

\* \* \* \* \*